United States Patent
Sakaguci et al.

(10) Patent No.: US 7,103,962 B2
(45) Date of Patent: Sep. 12, 2006

(54) METHOD FOR MANUFACTURING A THIN FILM HEAD

(75) Inventors: Masaya Sakaguci, Osaka (JP); Toshio Fukazawa, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 318 days.

(21) Appl. No.: 10/413,735

(22) Filed: Apr. 15, 2003

(65) Prior Publication Data

US 2003/0193760 A1 Oct. 16, 2003

Related U.S. Application Data

(62) Division of application No. 09/721,535, filed on Nov. 22, 2000, now Pat. No. 6,574,080.

(30) Foreign Application Priority Data

Nov. 25, 1909 (JP) ............................... 11-333776

(51) Int. Cl.
*G11B 5/127* (2006.01)
*H04R 31/00* (2006.01)

(52) U.S. Cl. ............................ 29/603.13; 29/603.07; 29/603.14; 29/603.27; 360/324; 360/325; 360/326; 360/327; 360/324.12; 427/127; 427/128

(58) Field of Classification Search ............. 29/603.07, 29/603.13, 603.14, 603.27; 360/324, 325, 360/326, 327, 324.12; 427/127, 128
See application file for complete search history.

(56) References Cited

U.S. PATENT DOCUMENTS

| 5,708,358 | A | * | 1/1998 | Ravipati ..................... 324/252 |
| 5,896,252 | A | * | 4/1999 | Kanai .................... 360/324.12 |
| 6,055,135 | A | * | 4/2000 | Fukamichi et al. .... 360/324.12 |
| 6,201,673 | B1 | * | 3/2001 | Rottmayer et al. .... 360/324.12 |

FOREIGN PATENT DOCUMENTS

JP 10177706 A * 6/1998

OTHER PUBLICATIONS

"Thin film head characteristics studied by inductance change from bias current control"; Kawakami, K.; Ohtu, T.; Homma, H.; Digests of Intermag '92., International; Apr. 13-16, 1992 pp. 8-8.*

"Thin film head characteristics studied by inductance change from bias current control" Kawakami, K.; Ohtu, T.; Homma, H.; Magnetics, IEEE Transactions on vol. 28, Issue 5, Sep. 1992 pp. 2109-2111.*

* cited by examiner

*Primary Examiner*—A. Dexter Tugbang
*Assistant Examiner*—Paul D. Kim
(74) *Attorney, Agent, or Firm*—RatnerPrestia

(57) ABSTRACT

A magnetoresistive thin film head comprises a magnetoresistive element including an antiferromagnetic layer, a pinned layer, a nonmagnetic conductive layer and a free magnetic layer, and a pair of the right and the left laminated transverse biasing layers, each including a nonmagnetic layer, a ferromagnetic layer and an antiferromagnetic layer, provided on the free magnetic layer constituting said magnetoresistive element. The layer thickness of said nonmagnetic layer has been established to a certain specific value so that magnetizing direction in said free magnetic layer opposing to the ferromagnetic layer via said nonmagnetic layer assumes a direction that is opposite to that of said ferromagnetic layer.

15 Claims, 21 Drawing Sheets

METHOD FOR MANUFACTURING A THIN FILM HEAD

This is a divisional of application Ser. No. 09/721,535, filed Nov. 22, 2000, now U.S. Pat. No. 6,574,080.

FIELD OF THE INVENTION

The present invention relates to a magnetoresistive thin film head for use in hard disk drives (HDD) or such other magnetic recording apparatus which record signals on magnetic recording media in high density, and reproduce the signals therefrom; specifically, the magnetoresistive thin film head in which stable biasing magnetic fields are provided on a free magnetic layer of a magnetoresistive element, for yielding a high reproducing efficiency. The present invention relates also to the method for manufacturing the magnetoresistive thin film head.

BACKGROUND OF THE INVENTION

The needs for higher processing speed and greater recording capacity are increasing among the magnetic disk apparatus (hereinafter collectively referred to as HDD) and other magnetic recording apparatus, and quite a number of efforts are being made for increasing the recording density. In order to meet the requirements for the higher density recording, the HDDs employ a thin film head, which head consisting of an inductive head for recording, and a magnetoresistive head (MR head), or a giant MR head (GMR head), for reproducing the signals.

A conventional thin film head is described below referring to FIG. 23 and FIG. 24. FIG. 23 is a perspective view showing outline at the sliding surface of a conventional thin film head facing a recording medium. FIG. 24 shows an outline view of the thin film head in the front.

In FIG. 23, a lower gap layer 232 of $Al_2O_3$, AlN, $SiO_2$, or other nonmagnetic insulating material is formed on a lower magnetic shield layer 231 made of a soft magnetic material such as Permalloy, a Co amorphous magnetic layer, an Fe alloy magnetic layer. On the upper surface of the lower gap layer 232, a magnetoresistive element 233 (an MR element or a GMR element, hereinafter both are collectively referred to as GMR element) is deposited, and a transverse biasing layer 234 is formed by a CoPt alloy or other such magnetic material at both of the right and the left ends of the GMR element 233. A lead layer 235 of conductive material such as Cu, Cr, Ta, etc. is provided on the upper surface of the transverse biasing layer 234 so that the lead layer 235 makes contact with a ridge line formed by the upper surface of the GMR element 233 and the end face. The lead layer 235 may be disposed on the upper surface of the transverse biasing layer 234 so that it covers part of the upper surface of the GMR element 233. Next, an upper gap layer 236 is formed over the lead layer 235 and the exposed region of the GMR element 233, using the same nonmagnetic insulating material as the lower gap layer 232. Further on top of the upper gap layer 236, an upper magnetic shield layer 237 is provided using the same soft magnetic material as the lower magnetic shield layer 231. This completes the reproducing part 238 of magnetoresistive head.

On the upper surface of the upper magnetic shield layer 237, a recording gap layer 241 is formed using the same nonmagnetic insulating material as the lower gap layer 232. An upper magnetic core 242, which faces to the upper magnetic shield layer 237 via the recording gap layer 241 and makes contact with the upper magnetic shield layer 237 at the rear scene of FIG. 23, is provided in the form of a layer using a soft magnetic material. Between the upper magnetic shield layer 237 and the upper magnetic core 242 facing to each other with the interposing recording gap layer 241, a coil 243 is provided electrically isolated from both the upper magnetic shield layer 237 and the upper magnetic core 242. This completes the recording part 240 of a magnetoresistive thin film head. The upper magnetic shield layer 237 works as the shield for the reproducing part 238 and as the lower magnetic core of the recording part 240.

FIG. 24 shows outline view in the front of the reproducing part at the vicinity of magetoresistive element of the above-described thin film head. A lower gap layer 232 is provided on the upper surface of the lower magnetic shield layer 231. On the lower gap layer 232, an antiferromagnetic layer 244 formed of a magnetic material such as an FeMn alloy, a PtMn alloy, a pinned layer 245 formed of a magnetic material such as a NiFe alloy, Co, a CoFe alloy, a nonmagnetic conductive layer 246 formed of a nonmagnetic conductive material such as Cu, a free magnetic layer 247 formed of the same material as the pinned layer 245, and a cap layer 248 formed of a nonmagnetic material such as Ta, are deposited sequentially. The laminated body of stacked layers is defined at both the right and the left ends by ion-milling or the like method so that each of the cut ends has a slant surface. Thus a GMR element 233 is provided. A pair of transverse biasing layers 234 are formed at both ends of the GMR element 233 in physical contact with the slant end surfaces, and a pair of the right and the left lead layers 235 are provided on the transverse biasing layers 234. On top of them, an upper gap layer 236 is formed, followed by upper magnetic shield layer 237. Gap length 249 of the reproducing part 238, which represents a total sum in the thickness of the lower gap layer 232, the GMR element 133, and the upper gap layer 236, takes a very small value, so that it is capable of reproducing the short-wavelength signals of high density recording.

Recording current supplied to the coil 243 generates recording magnetic fields in the recording gap layer 241 disposed between the upper magnetic core 242 and the upper magnetic shield layer 237 of the recording head 240, for recording the signals on a magnetic recording medium. The reproducing head 238 detects signal magnetic fields from a magnetic recording medium storing the signals, and signals reproduced by the GMR element 233 in accordance with the resistance change are taken out through the terminal of lead layer 235.

In order to be able to reproduce the short-wavelength signals stored in a magnetic recording medium, gap length of a reproducing head needs to be sufficiently short. As described earlier, the gap length is a distance between the upper surface of the lower magnetic shield layer and the lower surface of the upper magnetic shield layer. It means that the distance is represented by a total thickness of lower gap layer, the GMR element, and the upper gap layer. The short distance means that a pair of transverse biasing layers disposed at both the right and the left ends of the GMR element are existing very close to the lower magnetic shield layer or the upper magnetic shield layer. Under such circumstance, magnetic fields of the transverse biasing layers easily escape to the lower magnetic shield layer or the upper magnetic shield layer. Thus in a thin film head of the conventional structure, the biasing magnetic field, applied to the free magnetic layer of GMR element, becomes weak. And the direction of magnetization of the free magnetic layer is not orientated in a stable manner, and the noise increases, making it difficult to obtain stable reproducing signals.

SUMMARY OF THE INVENTION

The present invention addresses the above described drawbacks, and aims to make the orientation of magnetizing direction in the free magnetic layer stabilized, by providing the free magnetic layer of GMR element with accurate and stabilized biasing magnetic fields generated from the transverse biasing layers. By so doing, superior magnetoresistive head, having suppressed Barkhausen noise and superior reproducing characteristics, can be offered. The present invention also contains in it a method for manufacturing the magnetoresistive head.

The thin film head of the present invention comprises a magnetoresistive element formed of an antiferromagnetic layer, a pinned layer, a nonmagnetic conductive layer and a free magnetic layer, and a pair of the right and the left laminated transverse biasing layers, each consisting of a nonmagnetic layer, a ferromagnetic layer and an antiferromagnetic layer, formed on the free magnetic layer of the magnetoresistive element. In the present thin film head, the layer thickness of nonmagnetic layer has been established to a certain specific value so that magnetization directions of the free magnetic layer and ferromagnetic layer, which are facing via nonmagnetic layer, are opposite each other.

DETAILED DESCRIPTION OF THE EXEMPLARY EMBODIMENTS

Figure 1A:
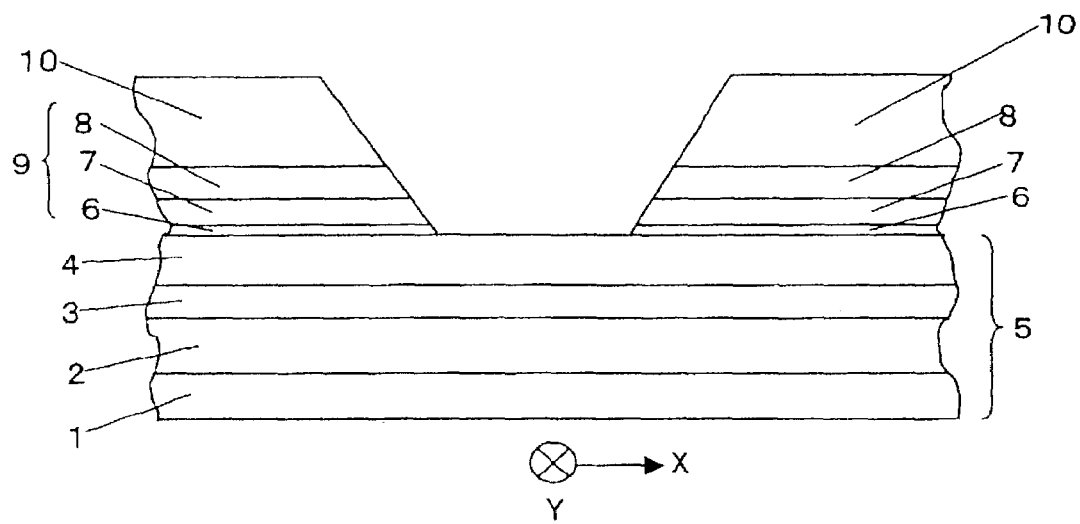
FIG. 1A is a front view showing the outline structure of a thin film head in accordance with a first exemplary embodiment of the present invention.
Figure 1B:
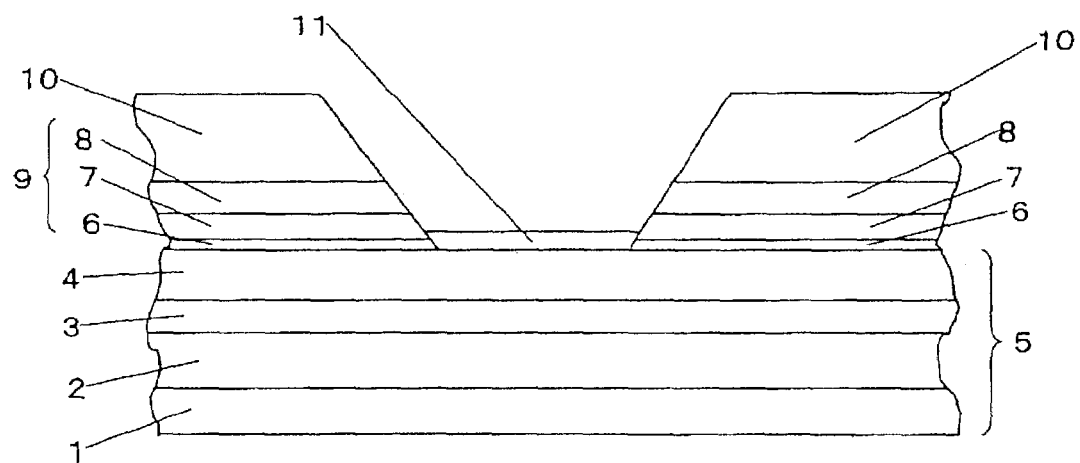
FIG. 1B is a front view similar to FIG. 1A with an optional cap layer.

A first exemplary embodiment of the present invention is described referring to FIGS. 1A and 1B.

FIGS. 1A and 1B show the structural concept of embodiment 1 of the present invention; a portion in the vicinity of the magnetoresistive element as viewed from the sliding surface facing to a magnetic recording medium. On a lower magnetic shield layer (not shown) formed of a soft magnetic material such as Permalloy, a Co amorphous magnetic layer, an Fe fine grain magnetic layer, a lower gap layer (not shown) of $Al_2O_3$, AlN, $SiO_2$, or other nonmagnetic insulating material is formed. On the lower gap layer, an antiferromagnetic layer 1 formed of a magnetic material such as IrMn, $\alpha Fe_2O_3$, an FeMn alloy layer, a PtMn alloy layer, a pinned layer 2 formed of a magnetic material such as a NiFe alloy layer, Co, a CoFe alloy layer, a nonmagnetic conductive layer 3 formed of Cu or other nonmagnetic conductive material, and a free magnetic layer 4 formed of the same ferromagnetic material as the pinned layer 2, are deposited sequentially to constitute a magnetoresistive element 5 (MR element or GMR element, hereinafter referred to collectively as GMR element). Further, on the upper surface of the free magnetic layer 4, which is a constituent of the GMR element 5, a pair of the right and the left laminated transverse biasing layers 9 are provided, each consisting of a nonmagnetic layer 6 of Ru or other nonmagnetic material, a ferromagnetic layer 7 of the same magnetic material as the free magnetic layer 4 and an antiferromagnetic layer 8 of the same antiferromagnetic material as the antifirromagnetic layer 1 (depending on situation, it is preferred not to use an oxidized metal). Magnetization direction of the ferromagnetic layers 7 is orientated to a certain specific direction and kept in a stable state by the effect of exchange-coupling magnetic fields with the antiferromagnetic layer 8. Therefore, the magnetization direction in the free magnetic layer 4, which is facing to the ferromagnetic layer 7 via the nonmagnetic layer 6, is maintained in a quite stable state, either in the same direction or in the opposite direction reflecting the layer thickness of the interposing nonmagnetic layer 6. In the same manner as in the conventional example, a pair of the right and the left lead layers 10 of nonmagnetic conductive material such as Cu, Cr, Ta, are provided on the top. Further on top of it, an upper gap layer (not shown) is formed using the like insulating material as the lower gap layer covering the entire area. Still further on top of it, an upper magnetic shield layer is formed using the same soft magnetic material as the lower magnetic shield layer to constitute the reproducing part of the thin film head of the present invention.

For the purpose of preventing the magnetic layers and the conductive layers from corrosion, a cap layer may be formed using Ta or other nonmagnetic material covering the pair of lead layers 10 and the exposed region of free magnetic layer 4.

In order to orientate magnetization direction of the pinned layer 2, which being a constituent of the GMR element 5, to direction Y, that is perpendicular to the sliding surface facing a magnetic recording medium (viz. a direction that is perpendicular to the sheet of FIGS. 1A and 1B), a heat treatment (annealing) is given under a predetermined temperature and time, while providing magnetic fields to the direction Y. Through the above procedure, magnetizing direction in the pinned layer 2 is fixed to the direction Y by the effect of exchange-coupling magnetic fields with the antiferromagnetic layer 1. Meanwhile, magnetizing direction in the pair of the right and the left ferromagnetic layers 7, which being constituent of the laminated transverse biasing layers 9, is made to be approximately perpendicular to that of the pinned layer 2 (direction X or direction –X, in FIGS. 1A and 1B). Material for the antiferromagnetic layer 8 needs to be selected among those magnetic materials whose annealing conditions for establishing magnetizing direction of the ferromagnetic layer 7 differs in at least one item of the conditions (strength of magnetic field, temperature, or process time) from annealing conditions for pinned layer 2.

Thickness of nonmagnetic layers 6 which being constituent of the pair of the laminated transverse biasing layers 9, is determined so that the magnetization direction of free magnetic layer 4 becomes opposite to that of the ferromagnetic layer 7 due to the strong exchange-coupling magnetic field generated between both layers. When the thickness of nonmagnetic layer 6 is small the free magnetic layer 4 assumes the same magnetization direction as the ferromagnetic layer 7. On the other hand, if the nonmagnetic layer 6 is too thick the free magnetic layer 4 returns to assume the initial magnetization direction, namely the same magnetization direction as that of the ferromagnetic layer 7. In this way, the direction of magnetization cyclically changes assuming the same and opposite directions, and strength of the exchange-coupling magnetic fields gradually reduces. Therefore, thickness of the nonmagnetic layer 6 needs to be determined within an appropriate range.

According to the results of studies conducted by the inventor and staff members, the appropriate layer thickness for the nonmagnetic layer 6 is dependent on the kind of nonmagnetic materials used. The optimum value found out for each of the materials is as shown in Table 1 below.

TABLE 1

| Nonmagnetic material used | Layer thickness for reversing the direction of magnetization |
|---|---|
| RU | 0.4–0.8 nm |
| Cu | Vicinity 0.9 nm, vicinity 2.0 nm |
| Ag, Au | 2-nm |
| Ir | Vicinity 1.3 nm |

As shown in FIG. 1B, a cap layer 11 may be provided using Ta or other nonmagnetic material, on the upper surface of the free magnetic layer 4, in a region between the pair of the right and the left transverse biasing layers 9.

In the present embodiment 1, a pair of the right and the left laminated transverse biasing layers, each consisting of a nonmagnetic layer, a ferromagnetic layer, and an antiferromagnetic layer, are formed on the free magnetic layer of GMR element via nonmagnetic layer. Magnetization direction of ferromagnetic layer is fixed to specific direction (direction –X) by annealing process. By selecting appropriate thickness of said nonmagnetic layer, free magnetic layer of GMR element and said ferromagnetic layer are antiferromagnetically coupled by the effect of exchange-coupling magnetic field, and magnetization direction of said free magnetic layer is orientated to opposite to specific direction (direction X). As a result, magnetization direction of free magnetic layer of GMR element can be fixed firmer as compared to a case of conventional structure. And, part of the free magnetic layer of GMR element in the region between the pair of the right and the left laminated transverse biasing layers also readily assumes the direction X in a stabilized manner. As described in the above, the magnetizing direction in the free magnetic layer of GMR element is in a quite stable state in the present embodiment 1. Thus, a thin film head of a high reproducing sensitivity and a stable reproducing performance is implemented with least Barkhausen noise.

Figure 2A:
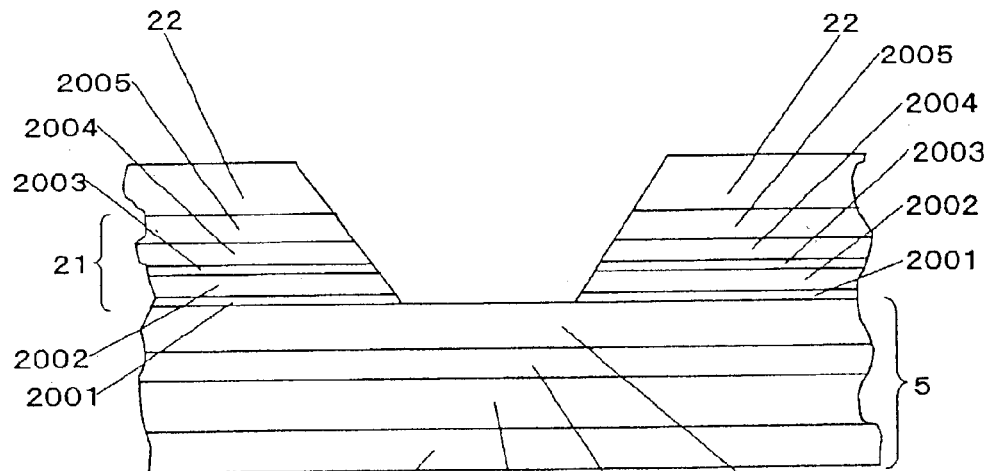
FIG. 2A is a front view showing the outline structure of a thin film head in accordance with a second exemplary embodiment of the present invention.
Figure 2B:
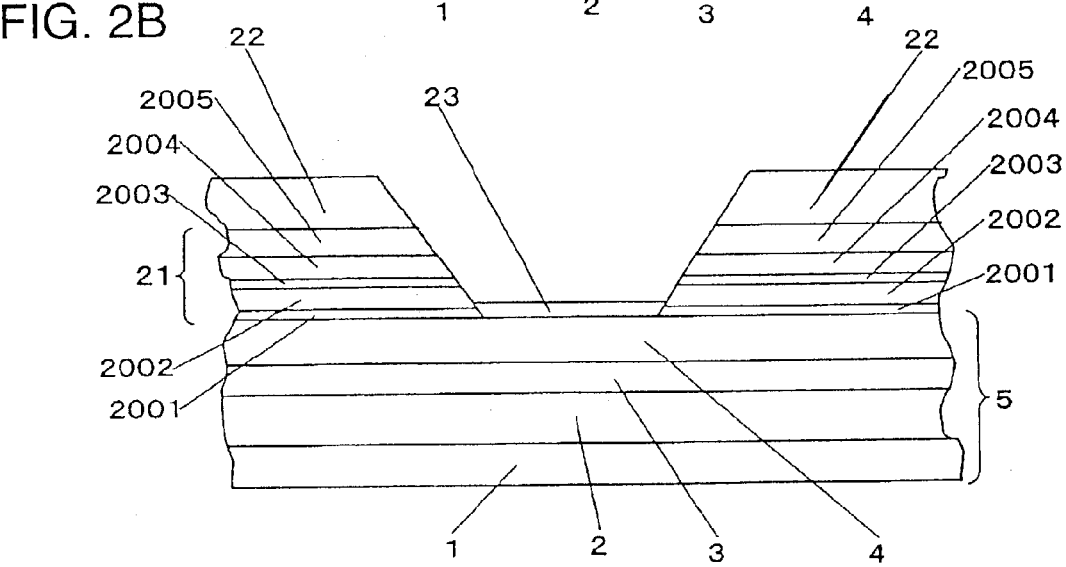
FIG. 2B is a front view similar to FIG. 2A with an optional cap layer.
Figure 2C:
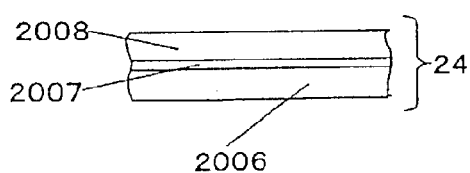
FIG. 2C illustrates a plurality of magnetic layers which may be included with the first and second embodiments of the invention.
Figure 2D:
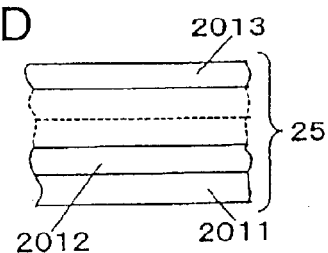
FIG. 2D illustrates a laminated layer which may be used with the first and second embodiments of the invention.

FIGS. 2A and 2D show an outline concept of a second exemplary embodiment of the present invention; it describes an area at the vicinity of magnetoresistive element, as seen from the sliding surface facing a magnetic recording medium.

In a second exemplary embodiment of the present invention shown in FIG. 2A, a lower gap layer (not shown) is formed on a lower magnetic shield layer (not shown) in the same way as in embodiment 1. Further on the lower gap layer, an antiferromagnetic layer 1, a pinned layer 2, a nonmagnetic conductive layer 3 and a free magnetic layer 4 are stacked sequentially to constitute a GMR element 5. On top of the GMR element 5, a pair of the right and the left laminated transverse biasing layers 21 are provided using the same material as in embodiment 1. Each of the layers are a first nonmagnetic layer 2001, a first ferromagnetic layer 2002, a second nonmagnetic layer 2003, a second ferromagnetic layer 2004, and an antiferromagnetic layer 2005. In the same manner as in embodiment 1, depending on the thickness of the first and the second nonmagnetic layers, the magnetization direction of first ferromagnetic layer and the free magnetic layer, and the magnetization direction of the first ferromagnetic layer and the second ferromagnetic layer, are determined to be either the same or reverse direction respectively. Also in the same manner as in embodiment 1, a lead layer 22 is formed on each of the pair of the right and the left laminated transverse biasing layers 21. An upper gap layer (not shown) is formed over the lead layers 22 and the exposed region of GMR element 5, and further on top of it an upper magnetic shield layer (not shown) is provided to complete the reproducing part of a magnetoresistive thin film head.

A cap layer 23 may be provided, as shown in FIG. 2B, on the upper surface of the free magnetic layer 4 of GMR 5 in a region between the pair of the right and the left laminated transverse biasing layers 21.

The above-configured embodiment 2 generates similar effects as those of embodiment 1. Namely, by providing an antiferromagnetic layer on the second ferromagnetic layer constituting the laminated transverse biasing layer, magnetizing direction in the second ferromagnetic layer is orientated to a certain specific direction by the effect of exchange-coupling magnetic fields between the second ferromagnetic layer and the antiferromagnetic layer. Furthermore, magnetizing direction in the first ferromagnetic layer, which layer is facing to the second ferromagnetic layer via the second nonmagnetic layer having a certain appropriate layer thickness, is orientated to a direction that is opposite to that of the second ferromagnetic layer. Still further, by disposing the free magnetic layer of GMR element to face the first ferromagnetic layer interposing the first nonmagnetic layer having a certain appropriate layer thickness in between, the direction of magnetization (e.g. direction X) in the free magnetic layer is fixed firmer as compared to a case where the free magnetic layer is attached direct to the antiferromagnetic material. As a result, magnetization direction of the free magnetic layer, in the region facing to the pair of the right and the left first ferromagnetic layers, is in a quite stable state, and magnetizing direction of the free magnetic layer in a region between the pair of the right and the left first ferromagnetic layers is also readily orientated to a certain specific direction in a stable state. Furthermore in the laminated transverse biasing layers, when a first ferromagnetic layer and a second ferromagnetic layer are faced to each other interposing a second nonmagnetic layer in between, and layer thickness of the second nonmagnetic layer is established so that respective directions of magnetization becomes opposite. Magnetic charge emerging at the ends of the first ferromagnetic layer and the second ferromagnetic layer cancel to each other; and leakage magnetic field caused by magnetic charge becomes small. As a result, the magnetizing direction in the first and the second ferromagnetic layers are orientated to a certain specific direction until the respective end portions. Therefore, a GMR element structured in accordance with the present embodiment 2 has a high sensitivity to the signal magnetic fields, and a stable performance. Thus a magnetoresistive head in accordance with the present embodiment 2 exhibits a more stable reproducing performance.

The pinned layer and the free magnetic layer in embodiment 1 and embodiment 2 have respectively been formed of a single material. However, these may be formed of a plurality of magnetic layers, as shown in FIG. 2C. A first pinned layer 2006, a first nonmagnetic layer 2007 and a second pinned layer 2008 may be provided for forming a laminated pinned layer 24. In this case, direction of magnetization in the first and the second pinned layers take the same or opposite direction depending on thickness of the nonmagnetic layer interposing between the first and the second pinned layers. The thickness of the nonmagnetic layer needs to be determined so that the layers assume the direction that is opposite to each other. Also the free magnetic layer may be configured in a laminated layer, as shown in FIG. 2D, consisting of a plurality of magnetic layers, a first free magnetic layer 2011, a second free magnetic layer 2012 . . . a free magnetic layer of n-th order 2013, or it can be a laminated free magnetic layer 25, where the adjacent free magnetic layers respectively use different kind of soft magnetic material.

Now in the following a third exemplary embodiment of the present invention is described referring to FIG. 3 through FIGS. 11A–11D. FIG. 3–FIGS. 11A–11D are used to describe outline of the manufacturing process for manufacturing the reproducing part of a magnetoresistive head in accordance with the present invention. The drawings show cross sectional views in the vicinity of the sliding surface facing a magnetic recording medium, sectioned by a plane parallel to the sliding surface. Method for manufacturing the reproducing part of a magnetoresistive thin film head is described with reference to the drawings following the order of process steps.

Figure 3:
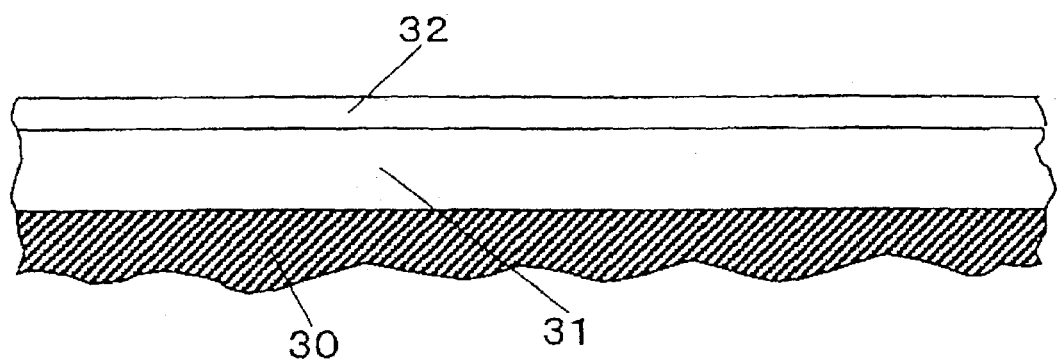
FIG. 3 is a front outline view used to describe part of the process for manufacturing a thin film head in accordance with a third exemplary embodiment of the present invention.

As shown in FIG. 3, on a substrate 30 made of AlTiC or other nonmagnetic material, a lower magnetic shield layer 31 is formed using soft magnetic material such as Permalloy, a Co amorphous magnetic layer, an Fe fine grain magnetic layer. On the lower magnetic shield layer, a lower gap layer 32 is formed using nonmagnetic insulating material such as $Al_2O_3$, AlN, $SiO_2$.

Figure 4A:
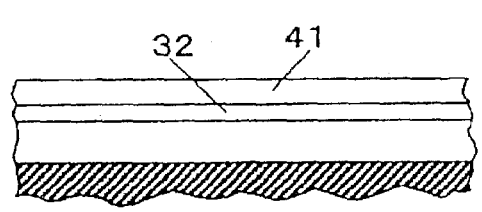
FIGS. 4A–4D are front outline views used to describe a first stage of process steps for manufacturing a thin film head in accordance with a third exemplary embodiment of the present invention.
Figure 4B:
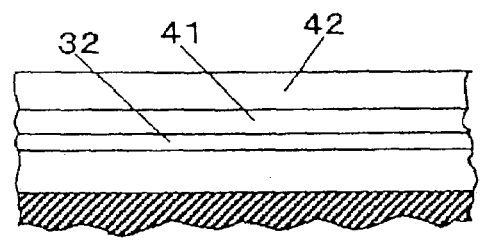
Figure 4C:
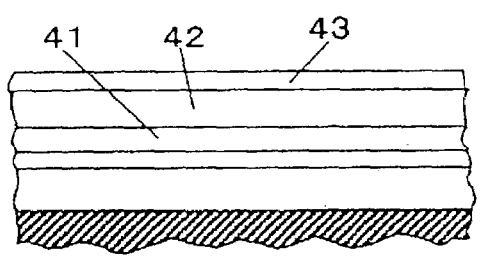
Figure 4D:
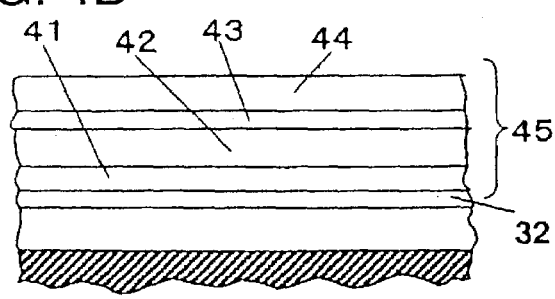

As the first process step, as shown in FIG. 4A, an antiferromagnetic layer 41 is formed on the lower gap layer 32 using magnetic material such as IrMn, $\alpha Fe_2O_3$, NiO, an FeMn alloy layer, a NiMn alloy layer, a PtMn alloy layer, etc., as shown in FIG. 4A. Then, as shown in FIG. 4B, a pinned layer 42 is formed on the antiferromagnetic layer 41 using magnetic material such as a NiFe alloy layer, a Co or CoFe alloy layer, etc. And then, as shown in FIG. 4C, a nonmagnetic conductive layer 43 is formed on the pinned layer 42 using Cu or other nonmagnetic conductive material. Further, as shown in FIG. 4D, a free magnetic layer 44 is formed on the nonmagnetic conductive layer 43 using the same material as the pinned layer 42. The above-described process steps complete a GMR element 45, which is consisting of the antiferromagnetic layer 41, a pinned layer 42, a nonmagnetic conductive layer 43 and the free magnetic layer 44 stacked in the order.

Figure 5A:
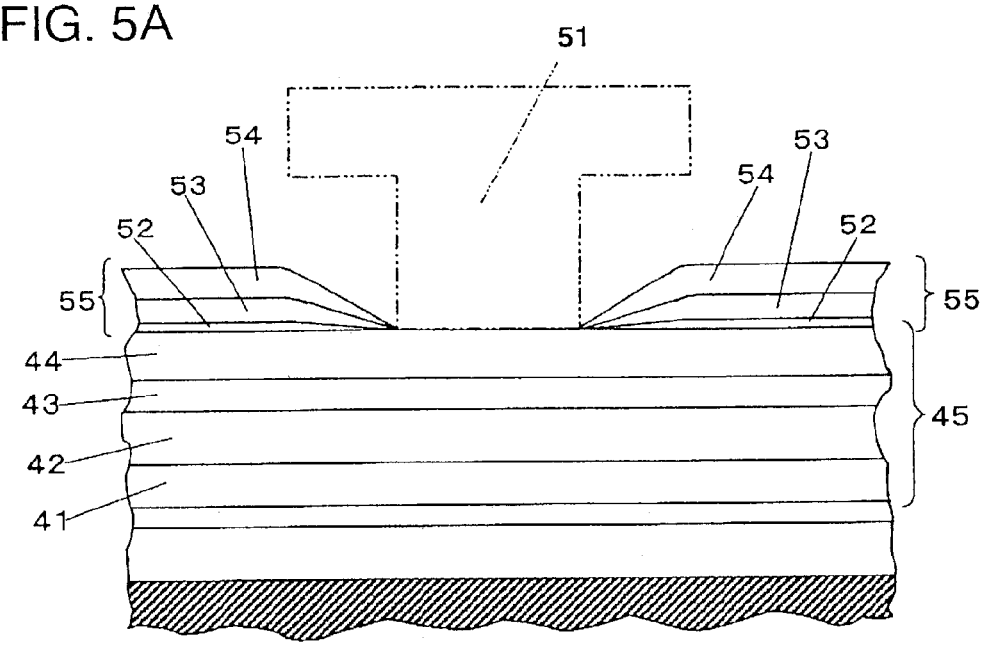
FIGS. 5A–5B are front outline views used to describe second and third stages of process steps for manufacturing a thin film head in accordance with a third exemplary embodiment of the present invention.

The second step is described using FIG. 5A. In the first place, a mushroom-shape resist 51 is provided on the GMR element 45. Then, a pair of the right and the left nonmagnetic layers 52 of Ru or other nonmagnetic material are deposited on the free magnetic layer 44 of GMR element 45, using the resist 51 as mask. The nonmagnetic layer 52 is grown to a certain specific thickness, at which thickness the magnetization direction in the free magnetic layer 44 becomes opposite to that of ferromagnetic layer, to be formed in a later step, by the effect of exchange-coupling magnetic fields with a ferromagnetic layer. On top of it, a pair of right and left ferromagnetic layers 53 are formed using the like magnetic material as the free magnetic layer 44 of GMR element 45. Further on top of it, a pair of the right and the left antiferromagnetic layers 54 are formed using the like magnetic material (depending on situation, it is preferred not to use a metal oxide layer) as the antiferromagnetic layer 41 of GMR element 45. Thus a pair of the right and the left laminated transverse biasing layers 55 are formed, each consisting of the nonmagnetic layer 52, the ferromagnetic layer 53, and the antiferromagnetic layer 54. Material for the antiferromagnetic layer 54 needs to be selected among those magnetic materials whose annealing conditions for establishing magnetizing direction of the ferromagnetic layer 53 differs in at least one item of the conditions (strength of magnetic field, temperature, or process time) from annealing conditions for pinned layer 42.

Figure 5B:
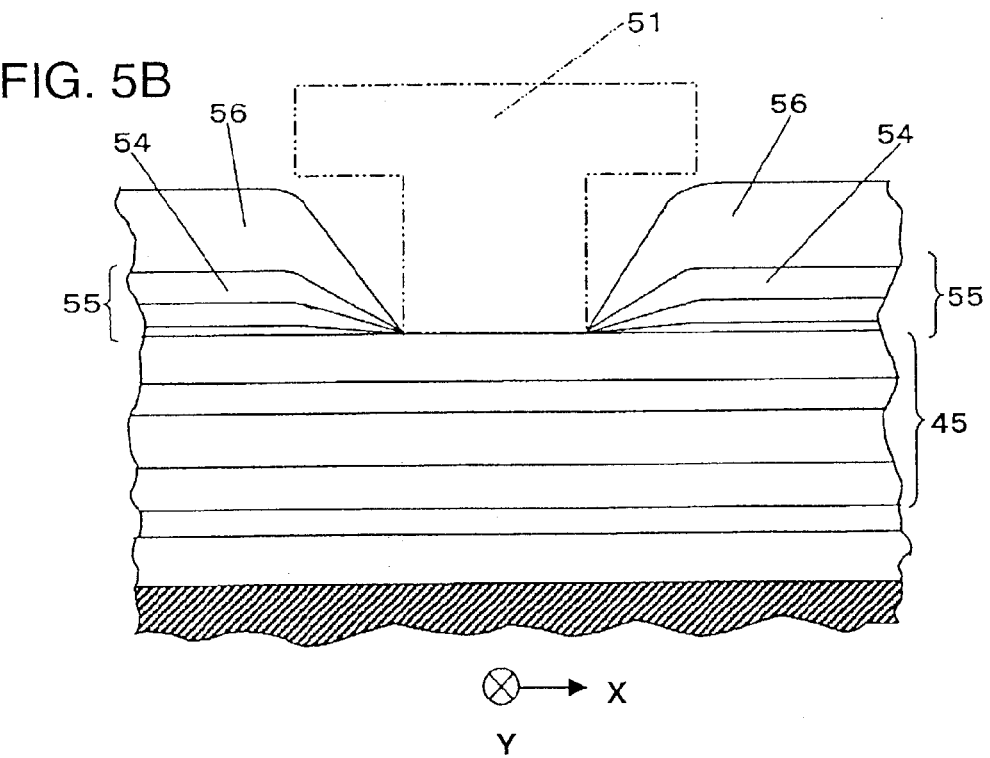

The third process step is shown in FIG. 5B. A lead layer 56 is formed, using Cu, Cr, Ta or other nonmagnetic conductive material, on each of the pair of the right and the left antiferromagnetic layers 54, using the resist layer 51 as mask.

Figure 6A:
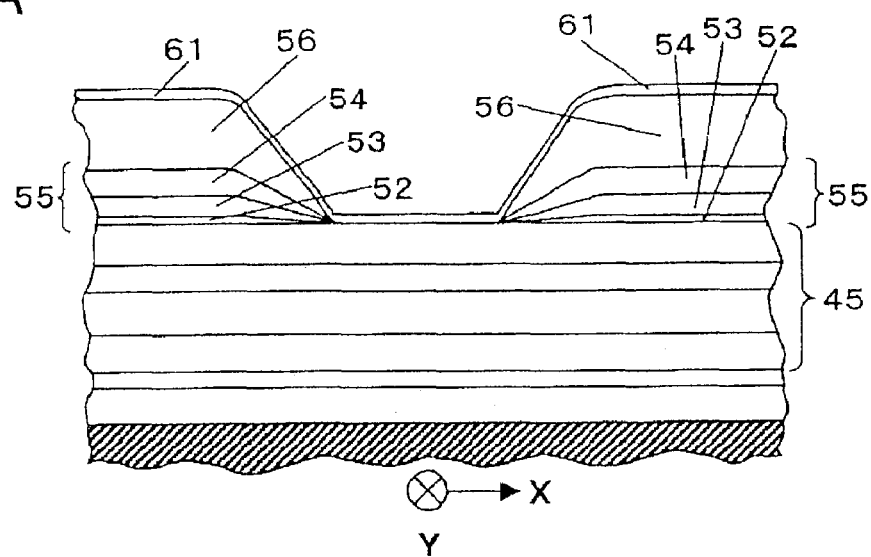
FIGS. 6A–6C are front outline views used to describe a fourth stage of a process step for manufacturing a thin film head in accordance with a third exemplary embodiment of the present invention.
Figure 6B:
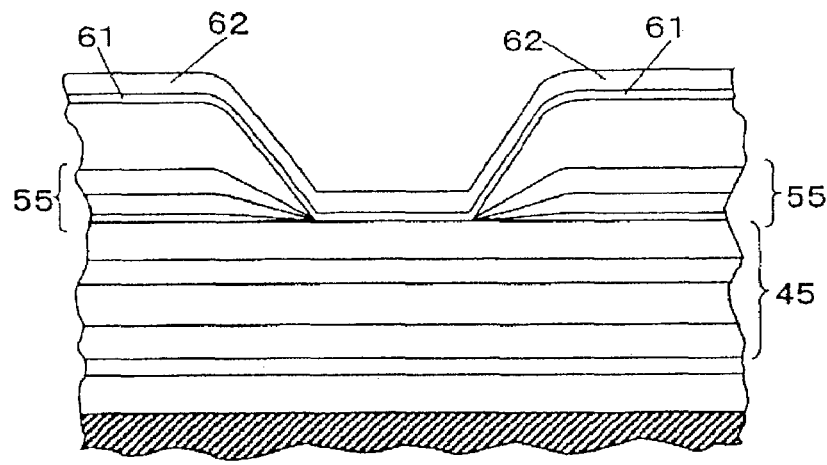
Figure 6C:
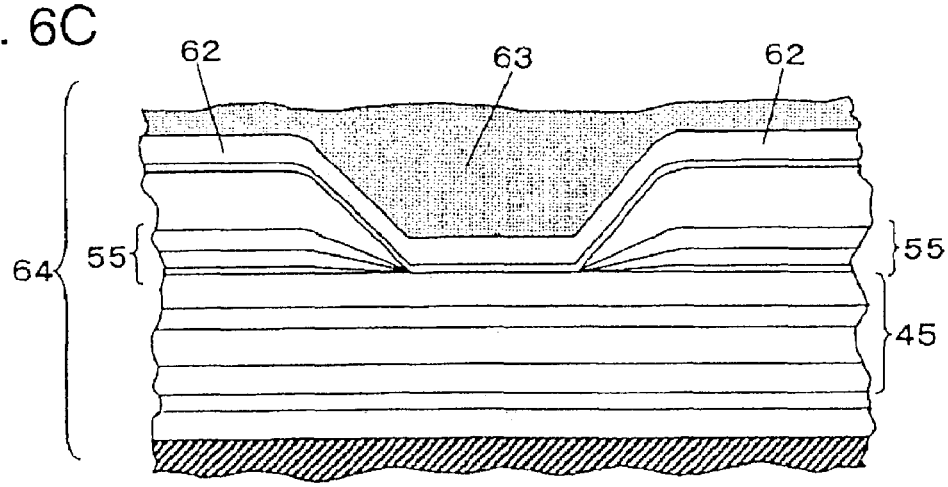

The fourth process step is shown in FIGS. 6A–6C. In the first place, a cap layer 61 of Ta or other nonmagnetic material is formed after removing the resist layer 51, as shown in FIG. 6A. Cap layer covers the pair of the right and the left lead layers 56 and the exposed region of the GMR element 45, in order to prevent the free magnetic layer 44, which is exposed at the surface of GMR element 45, from corrosion for an improved anticorrosion property. Next, as shown in FIG. 6B, an upper gap layer 62 is formed on the top using the like nonmagnetic insulating material as the lower gap layer 32. Then, as shown in FIG. 6C, an upper magnetic shield layer 63 is formed using the like soft magnetic material as the lower magnetic shield layer 31, on the upper gap layer 62. Thus the reproducing part 64 of a magnetoresistive thin film head is constituted.

Heat treatment (annealing) to establish respective directions of magnetization in a pinned layer of the GMR element or a ferromagnetic layer of the laminated transverse biasing layer should preferably be conducted at a stage after the lead layer 56 and the cap layer 61 are formed. And it should be conducted before the GMR element 45, the pair of the right and the left laminated transverse biasing layers 55, the pair of the right and the left lead layers 56, and the cap layer 61 are patterned to a certain specific shape. Namely, after the fourth step is finished, a first heat treatment is conducted at a predetermined temperature and duration while applying magnetic fields in Y direction. Y direction is perpendicular to the sliding surface of the head, facing a magnetic recording medium (a direction perpendicular to the sheet of FIG. 6A). Through this heat treatment, magnetizing direction of pinned layer 42 is fixed in direction Y by the effect of exchange-coupling magnetic fields with the antiferromagnetic layer 41. And then, a second heat treatment is conducted to orientate the magnetization direction of ferromagnetic layer 53 under the different conditions from those of the first annealing, while applying magnetic fields in –X direction. –X direction is perpendicular to Y direction that is the magnetization direction of pinned layer 42. In this way, the ferromagnetic layer 53 is magnetized to a direction perpendicular to that in the pinned layer 42, without affecting the magnetizing direction of the pinned layer 42. Through the above procedure, the free magnetic layer 44 is magnetized to a direction X, that is opposite to that of the ferromagnetic layer 53, by the effect of exchange-coupling magnetic fields with the ferromagnetic layer 53. As to the order of conducting the heat treatment (annealing) for establishing the direction of magnetization, whichever may be treated earlier than the other, either the pinned layer of GMR element or the ferromagnetic layer of laminated transverse biasing layer.

In the second step after the mushroom-shape resist 51 is provided, the upper surface of the free magnetic layer 44 locating at the uppermost stratum of GMR element 45 is cleaned by means of Ar presputtering, ECR, or other method. Oxides, residual resists, foreign substance, stains, etc. sticking on the surface of free magnetic layer 44 are removed by this process. After that, constituent layers of the laminated transverse biasing layer 55 are stacked one on the other. The surface cleaning of the free magnetic layer 44 conducted before formation of the laminated transverse biasing layer 55 is effective to eliminate foreign substances intervening between the laminated transverse biasing layer and the free magnetic layer for curtailing deterioration of the exchange-coupling magnetic fields. This contributes to maintain strong exchange-coupling magnetic fields between the laminated transverse biasing layer and the free magnetic layer.

Figure 7A:
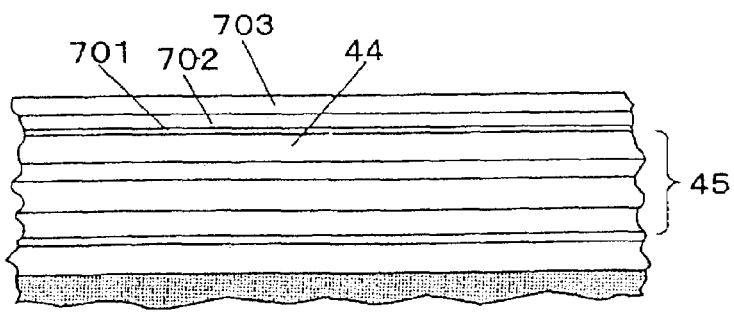
FIGS. 7A–7D are front outline views used to describe second and third stages of process steps for manufacturing a thin film head in accordance with another example of a third exemplary embodiment of the present invention.
Figure 7B:
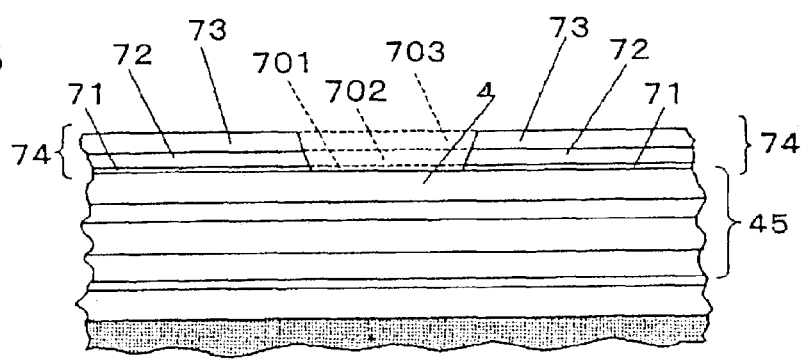

Other method for manufacturing the reproducing part of a magnetoresistive thin film head of the present invention is described with reference to FIGS. 7A–7D. After the constituent layers are deposited to form the GMR element 45, as shown in FIG. 7A, laminated transverse biasing layers, consisting of nonmagnetic layer 701, ferromagnetic layer 702, and antiferromagnetic layer 703, are stacked in the order on the upper surface of the free magnetic layer 44. Each of the layers of GMR element and the laminated transverse biasing layer is formed of the same material as that used in embodiment 1 for the GMR element and the laminated transverse biasing layer. Then, photoresist is coated on the surface of the antiferromagnetic layer 703. And the stacked nonmagnetic layer 701, ferromagnetic layer 702, and antiferromagnetic layer 703 are removed in part by dry etching or other process until the upper surface of the free magnetic layer 44 of GMR element 45 is exposed. In this way, a pair of the right and the left laminated transverse biasing layers 74, each consisting of a nonmagnetic layer 71, a ferromagnetic layer 72 and an antiferromagnetic layer 73, are provided. The etching may be conducted so that only the ferromagnetic layer 702 and the antiferromagnetic layer 703 are etched off, while keeping the nonmagnetic layer 701 as it is.

Heat treatment for establishing the direction of magnetization in the pinned layer of GMR element and the ferromagnetic layer of laminated transverse biasing layer should preferably be conducted before exerting the dry etching, after the nonmagnetic layer 701, the ferromagnetic layer 702 and the antiferromagnetic layer 703 have been stacked.

Figure 7C:
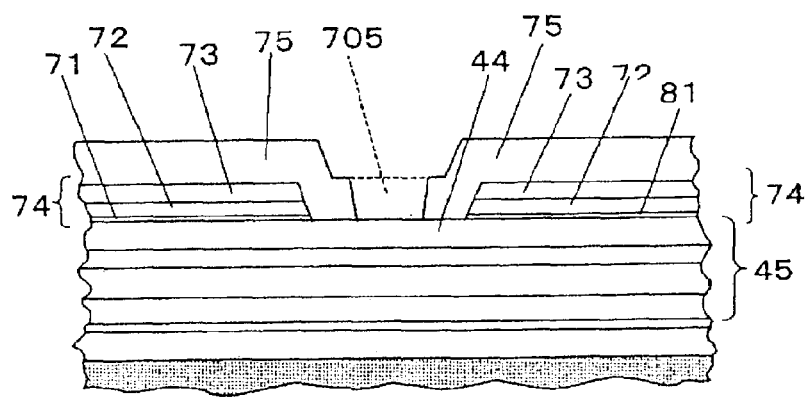
Figure 7D:
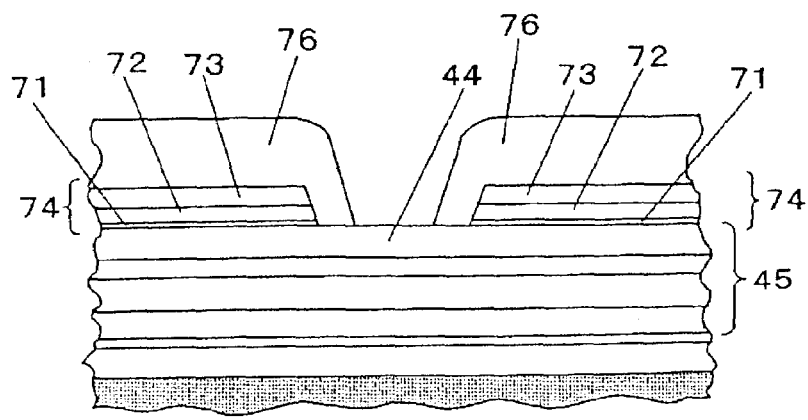

As shown in FIG. 7C, a lead layer 705 is formed covering the pair of the right and the left laminated transverse biasing layers 74 and the exposed region of GMR element 45. Lead layer is then removed in a region between the laminated transverse biasing layers 74 by means of dry etching or other method to provide the lead layers 75. The lead layers 76 may be formed instead by providing a mushroom-shape resist (not shown) between the pair of laminated transverse biasing layers 74 and using it as mask, as shown in FIG. 7D.

Figure 8:
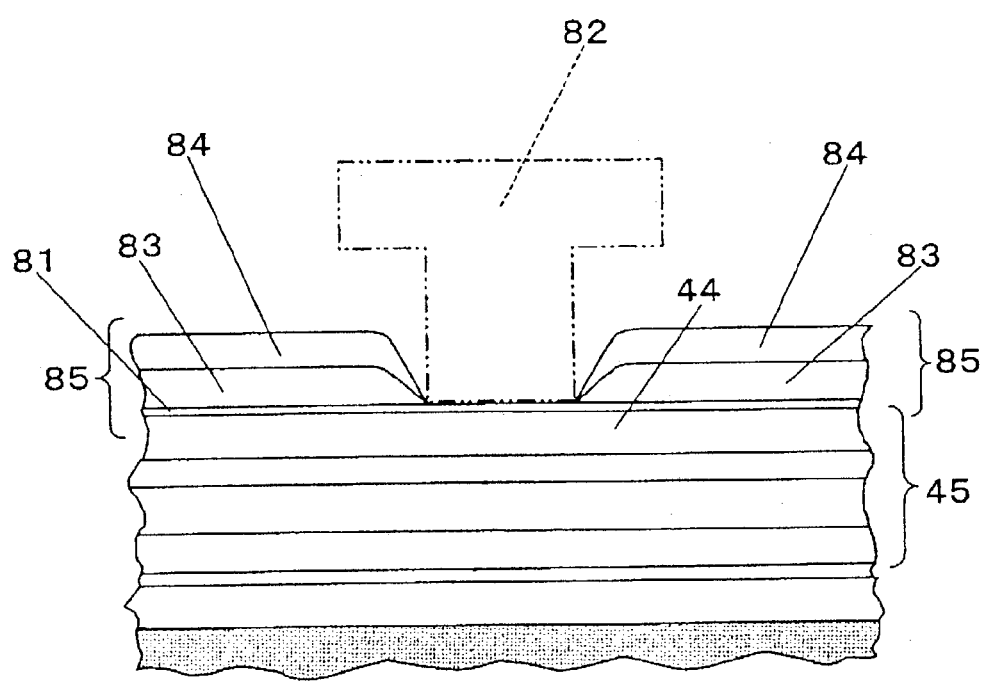
FIG. 8 is a front outline view used to describe a second stage of a process step for manufacturing a thin film head in accordance with another example of a third exemplary embodiment of the present invention.

Other method for manufacturing a laminated transverse biasing layer is described with reference to FIG. 8. After forming a nonmagnetic layer 81 using Ru or other nonmagnetic material for a certain specific layer thickness that satisfies the earlier-described conditions specified for the nonmagnetic layer, covering the upper surface of the free magnetic layer 44 of GMR element 45, a mushroom-shape resist 82 is provided to be used as mask for stacking a pair of the right and the left ferromagnetic layers 83 and antiferromagnetic layers 84 for providing a pair of the right and the left laminated transverse biasing layers 85, each consisting of a nonmagnetic layer 81, a ferromagnetic layer 83 and an antiferromagnetic layer 84.

Figure 9A:
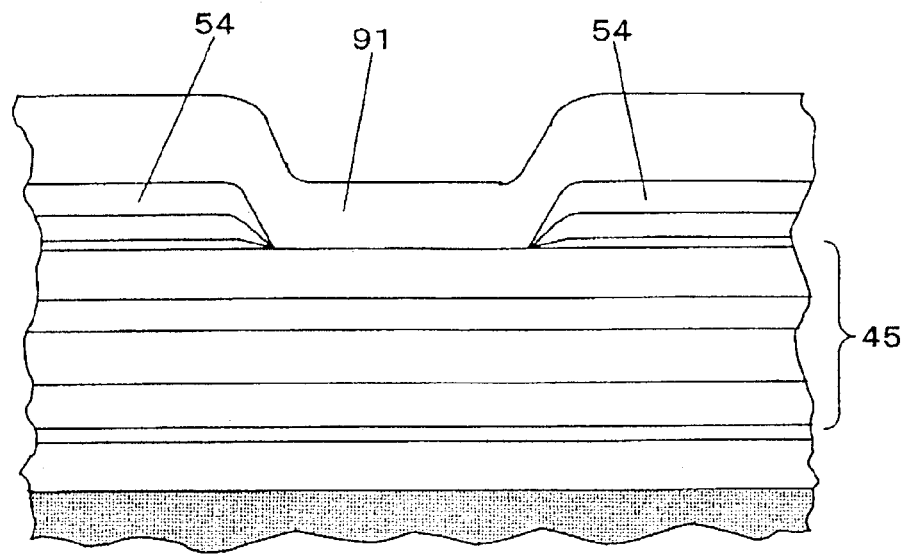
FIGS. 9A–9C are front outline views used to describe a third stage of process steps for manufacturing a thin film head in accordance with other example of a third exemplary embodiment of the present invention.
Figure 9B:
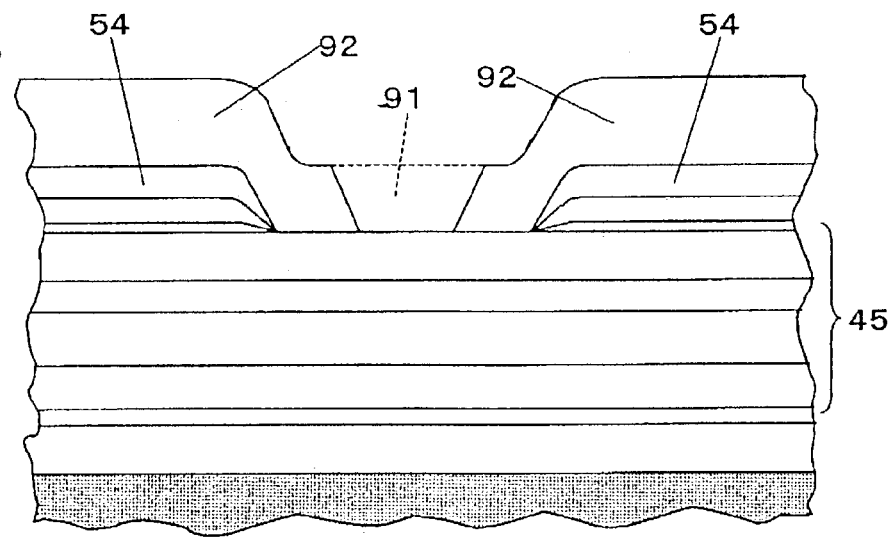
Figure 9C:
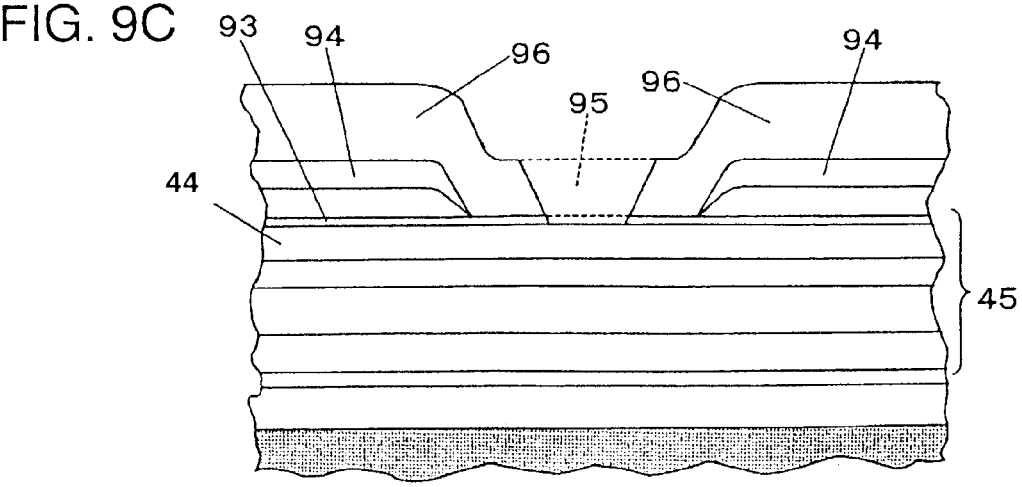
Figure 10A:
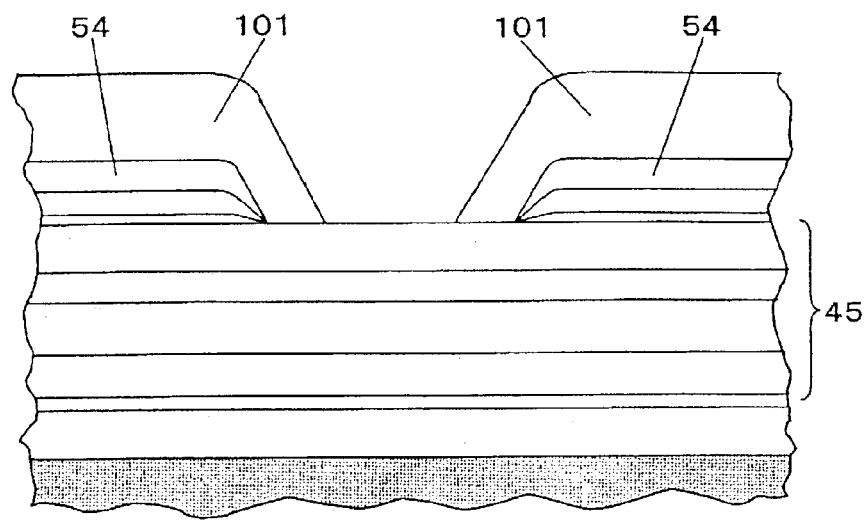
FIGS. 10A–10C are front outline views used to describe a third stage of process steps for manufacturing a thin film head in accordance with another example of a third exemplary embodiment of the present invention.
Figure 10B:
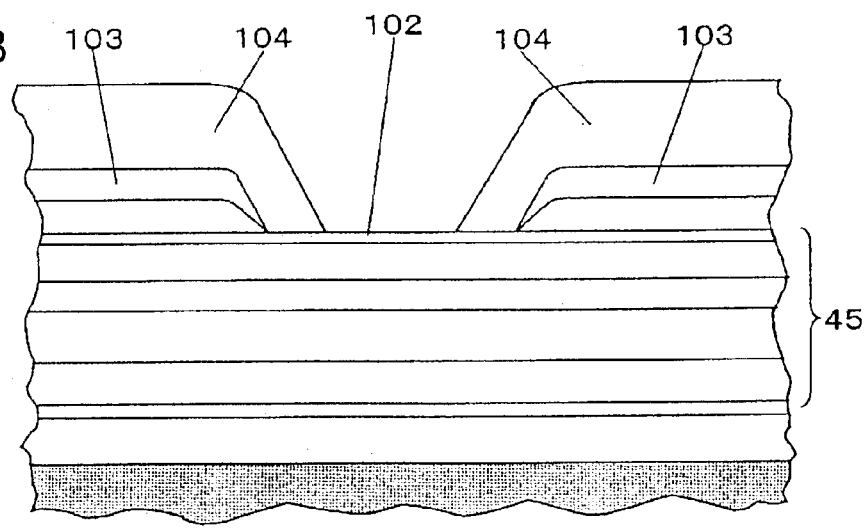
Figure 10C:
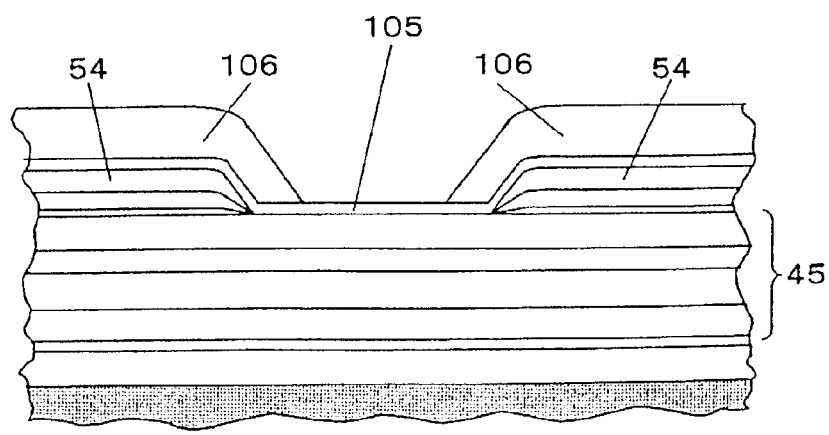

Next, other method for forming a lead layer on the pair of laminated transverse biasing layers is described. After a pair of the right and the left antiferromagnetic layers 54 are provided using the mushroom-shape resist 51 as mask, as shown in FIG. 5A, the mushroom-shape resist 51 is removed. Then a lead layer 91 is formed covering the pair of the right and the left antiferromagnetic layers 54 and the exposed region of GMR element 45, as shown in FIG. 9A. After that, as shown in FIG. 9B, part of the lead layer 91 is etched off by dry etching or other method to provide a pair of the right and the left lead layers 92. FIG. 9C shows still other method for providing a lead layer. A nonmagnetic layer 93 is formed covering the upper surface of the free magnetic layer 44 of GMR element 45, and then on the upper surface of the nonmagnetic layer 93 a pair of the right and the left laminated transverse biasing layers are formed. A lead layer 95 is formed covering the antiferromagnetic layers 94 of the laminated transverse biasing layers and the exposed region of nonmagnetic layer 93. After that, part of the lead layer 95 is etched off by dry etching or other method until part of the nonmagnetic layer 93 or GMR element 45 is exposed for providing a pair of the right and the left lead layers 96. Still other method is shown in FIG. 10A; where, the layers up to the antiferromagnetic layer 54 are stacked in accordance with the procedure of forming laminated transverse biasing layer as described using FIG. 5A. Then the mushroom-shape resist 51 is removed to be replaced with other mushroom-shape resist for forming a pair of the right and the left lead layers 101 covering the antiferromagnetic layer 54 and part of the exposed region of GMR element 45. FIG. 10B shows still other method; where, after the pair of the right and the left laminated transverse biasing layers are formed in accordance with the procedure described with reference to FIG. 8, the mushroom-shape resist 51 is removed to be replaced with other mushroom-shape resist for forming a pair of the right and the left lead layers 104 covering the pair of the right and the left antiferromagnetic layer 103 and part of the exposed region of nonmagnetic layer 102. FIG. 10C shows still other method; where, after the mushroom-shape resist 51 is removed a cap layer 105 is formed using Ta or other material covering the antiferromagnetic layers 54 and part of the exposed region of GMR element 45. Then on the upper surface of the cap layer locating on the GMR element 45 another mushroom-shape resist (not shown) is provided as mask for forming a pair of the right and the left lead layers 106 by sputtering a conductive material, or through other method. There is still other method; where, after the pair of the right and the left laminated transverse biasing layers 85 are provided as shown in FIG. 8, the mushroom-shape resist 82 is removed. Then, in the same way as described above, a cap layer is formed covering the antiferromagnetic layers 84 and the exposed region of nonmagnetic layer 81, and then on top of it another mushroom-shape resist is provided for forming a pair of the right and the left lead layers.

Figure 11A:
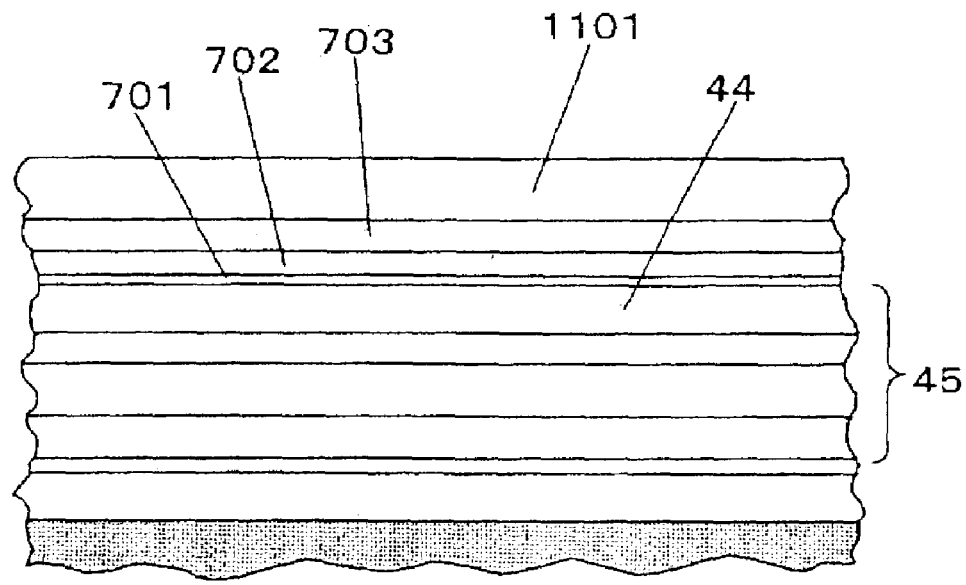
FIGS. 11A and 11B are front outline views used to describe a third stage of process steps for manufacturing a thin film head in accordance with another example of a third exemplary embodiment of the present invention.
Figure 11B:
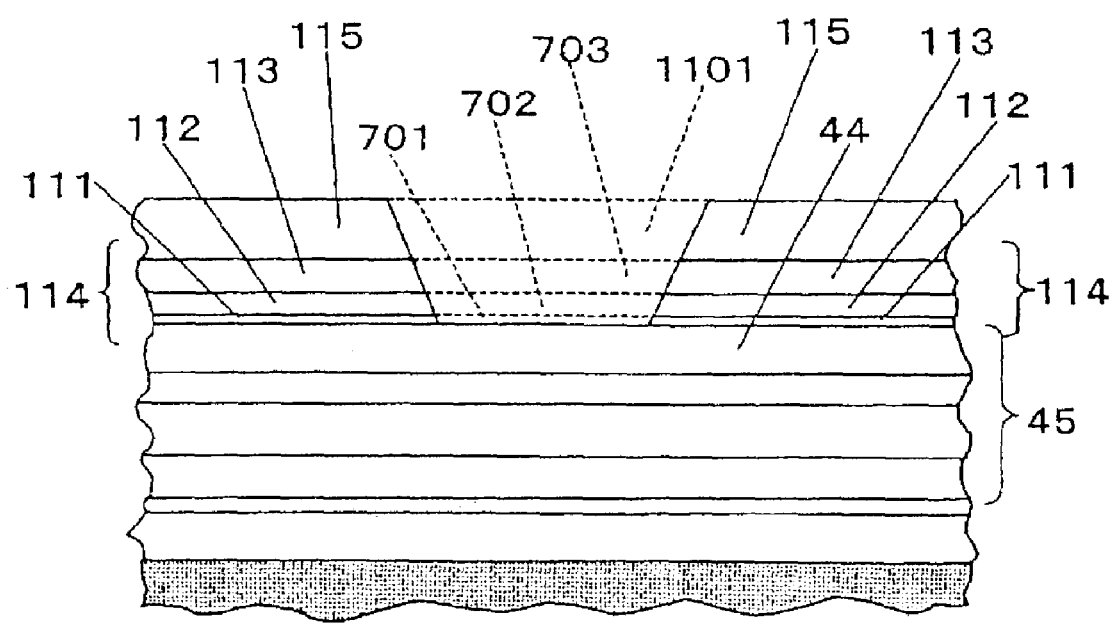

It may also be manufactured through a procedure as shown in FIG. 11A, where: Stacking a nonmagnetic layer 701, a ferromagnetic layer 702 and an antiferromagnetic layer 703 in the order covering the upper surface of a free magnetic layer 44 of GMR element 45, and on top of it a lead layer 1101 is formed; and then removing at least the lead layer 1101, the antiferromagnetic layer 703, and the ferromagnetic layer 702 by dry etching or other method so that part of the nonmagnetic layer 701 or the free magnetic layer 44 is exposed as shown in FIG. 11B, for providing a pair of the right and the left laminated transverse biasing layers 114, each consisting of a nonmagnetic layer 111, a ferromagnetic layer 112 and an antiferromagnetic layer 113, as well as a pair of the right and the left lead layers 115, on the free magnetic layer 44. Also in this procedure, it is preferred that the heat treatment for orientating the magnetizing direction in the pinned layer of GMR element and the ferromagnetic layer 112 to a certain specific direction is conducted before exerting the dry etching, and after the nonmagnetic layer, the ferromagnetic layer, the antiferromagnetic layer, and the lead layer have been stacked.

As described in the above, in the present embodiment, the transverse biasing layer for providing a free magnetic layer with a direction of magnetization has been structured as a pair of the right and the left laminated transverse basing layers each consisting of a nonmagnetic layer, a ferromagnetic layer, and an antiferromagnetic layer stacked together. The antiferromagnetic layer stacked on the ferromagnetic layer contributes to dispose magnetization direction of the ferromagnetic layer to a certain specific direction (e.g. direction −X) by the effect of exchange-coupling magnetic fields between ferromagnetic layer and antiferromagnetic layer. The free magnetic layer of GMR element is formed to face to the pair of the right and the left ferromagnetic layers interposing a nonmagnetic layer having a certain appropriate layer thickness in between. In the facing regions, the exchange-coupling magnetic fields supplied from the ferromagnetic layer are stronger as compared with a configuration where the free magnetic layer is placed in direct contact with the antiferromagnetic layer. As a result, the free magnetic layer firmly holds a magnetizing direction (direction X) that is opposite to that of the ferromagnetic layer. In the free magnetic layer, also a region between the pair of the right and the left ferromagnetic layers readily takes the direction X with a good stability. Thus there is least Barkhausen noise, and a magnetoresistive thin film head having a quite stable reproducing capability is offered in accordance with the present embodiment.

A fourth exemplary embodiment of the present invention is described referring to FIGS. 12A and 12B through FIG. 19. FIGS. 12A and 12B–FIG. 19 are cross sectional views of a magnetoresistive thin film head of the present invention sectioned by a plane parallel to the sliding surface in the vicinity of a region facing a magnetic recording medium. In the following, a method for manufacturing the reproducing part of a magnetoresistive thin film head is described in the order of process steps using the drawings.

As the first process step, like that in embodiment 3 shown in FIG. 4D, a lower gap layer 32, an antiferromagnetic layer 41, a pinned layer 42, a nonmagnetic conductive layer 43, and a free magnetic layer 44 are stacked in the order to form a GMR element 45.

Figure 12A:
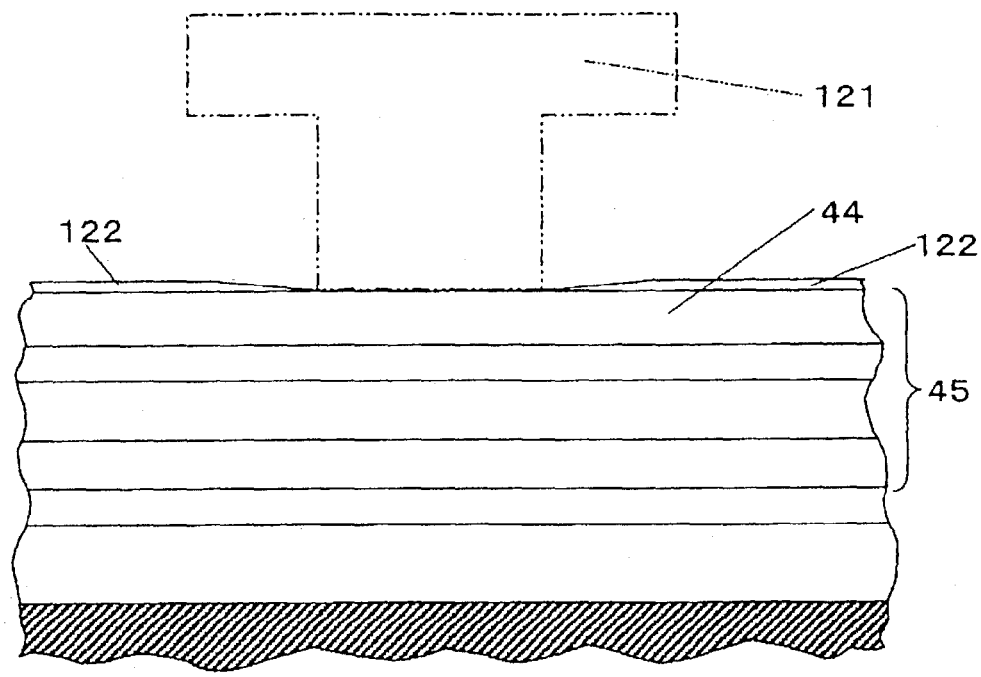
FIGS. 12A and 12B are front outline views used to describe part of a second stage of process steps for manufacturing a thin film head in accordance with a fourth exemplary embodiment of the present invention.
Figure 12B:
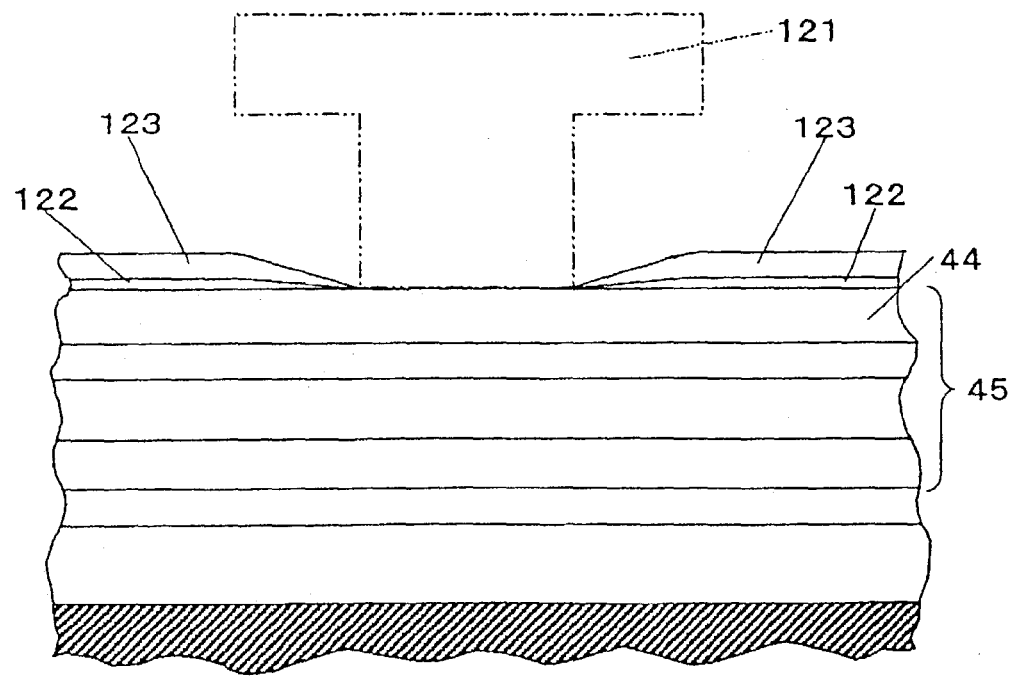
Figure 13A:
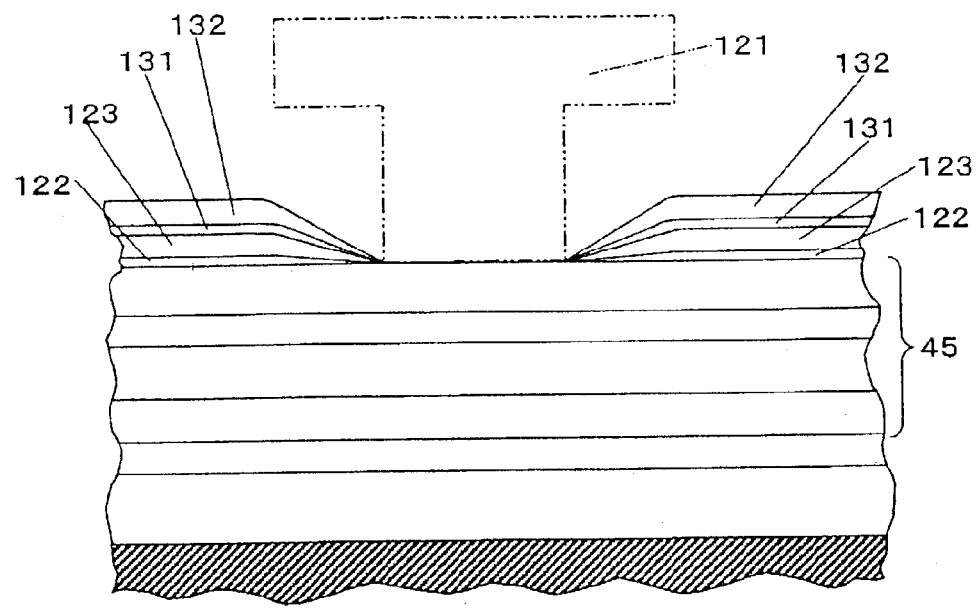
FIGS. 13A and 13B are front outline views used to describe another part of a second stage of process steps for manufacturing a thin film head in accordance with a fourth exemplary embodiment of the present invention.
Figure 13B:
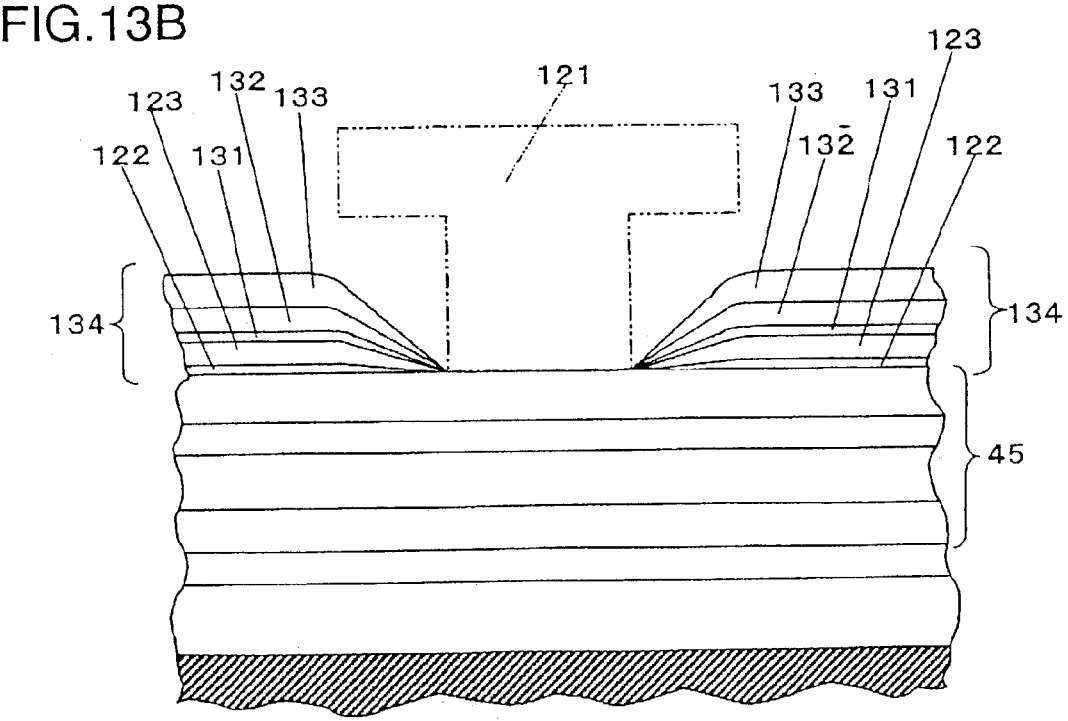

The second process step is described using FIG. 12A. In the first place, a mushroom-shape resist 121 is provided on the free magnetic layer. Then, a pair of the right and the left first nonmagnetic layers 122 are formed on the free magnetic layer 44, using the resist 121 as mask. The layer thickness of nonmagnetic layer 122 is specified to a certain specific value in accordance with the same conditions as in embodiment 1. On the top of it, a pair of first ferromagnetic layers 123 is formed as shown in FIG. 12B. Further as shown in FIG. 13A, a second nonmagnetic layer 131 and a second ferromagnetic layer 132 are stacked in the order on the first ferromagnetic layer 123. Next, as shown in FIG. 13B, an antiferromagnetic layer 133 is formed on the second ferromagnetic layer 132, to provide a pair of the right and the left laminated transverse biasing layers 134, each consisting of the first nonmagnetic layer 122, the first ferromagnetic layer 123, the second nonmagnetic layer 131, the second ferromagnetic layer 132 and the antiferromagnetic layer 133. Materials used for the nonmagnetic layer, ferromagnetic layer, antiferromagnetic layer remain the same as the respective counterparts in embodiment 3.

Figure 14A:
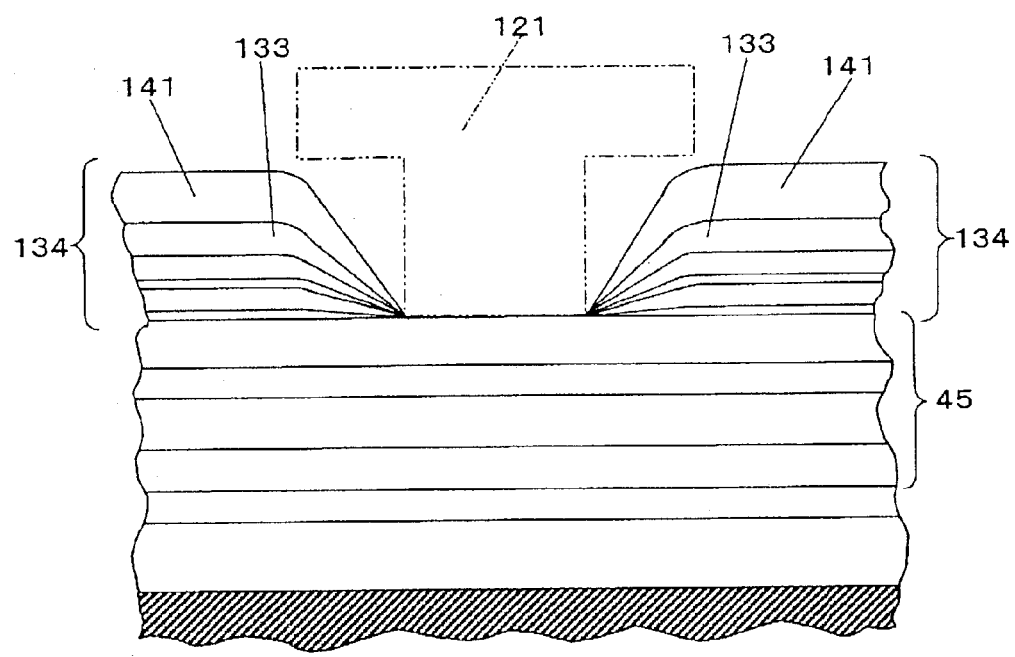
FIGS. 14A and 14B are front outline views used to describe a third stage and a fourth stage of process steps for manufacturing a thin film head in accordance with a fourth exemplary embodiment of the present invention.

In the third process step, a pair of the right and the left lead layers 141 are formed on the antiferromagnetic layer 133 using Cu, Cr, Ta or other nonmagnetic conductive material, as shown in FIG. 14A.

Figure 14B:
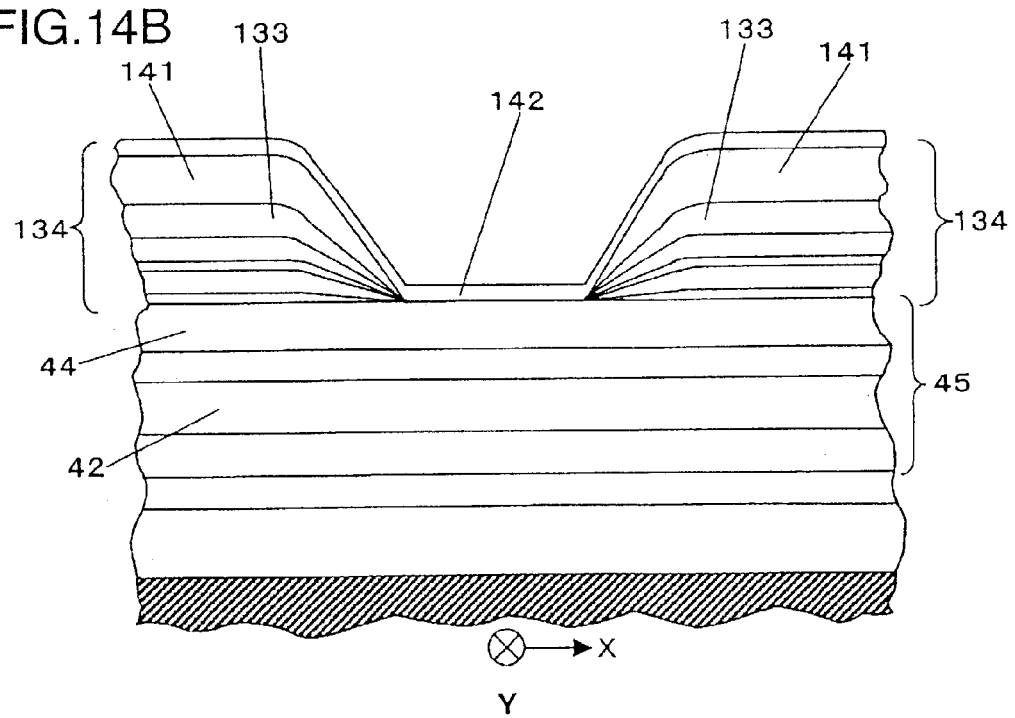

The fourth process step is to provide a cap layer 142 of Ta or other nonmagnetic material, as shown in FIG. 14B. Cap layer is formed to cover the pair of lead layers 141 and the exposed region of GMR element 45 in order to prevent the free magnetic layer 44 from corrosion for an improved anticorrosion property.

Material for the antiferromagnetic layer 133 needs to be selected to satisfy the same conditions described earlier in embodiment 3. After the cap layer 142 is formed, the same heat treatment is made as in embodiment 3 to orientate the magnetizing direction of pinned layer 42 in direction Y, and of free magnetic layer 44 in direction −X. Here, direction −X and Y is perpendicular each other.

In the second process step after the mushroom-shape resist is provided, a cleaning process may be inserted for cleaning the upper surface of the free magnetic layer 44 locating at the uppermost stratum of GMR element 45. By means of Ar presputtering, ECR or other method, residual resists, foreign substance, and stains sticking on the surface of the free magnetic layer 44, are removed. Then proceed to a procedure shown in FIG. 13B, and thereafter. The insertion of a process step of cleaning the surface of the free magnetic layer 44 contributes to enhance the exchange-coupling magnetic fields between the pair of the right and the left laminated transverse biasing layers and the free magnetic layer.

Figure 15A:
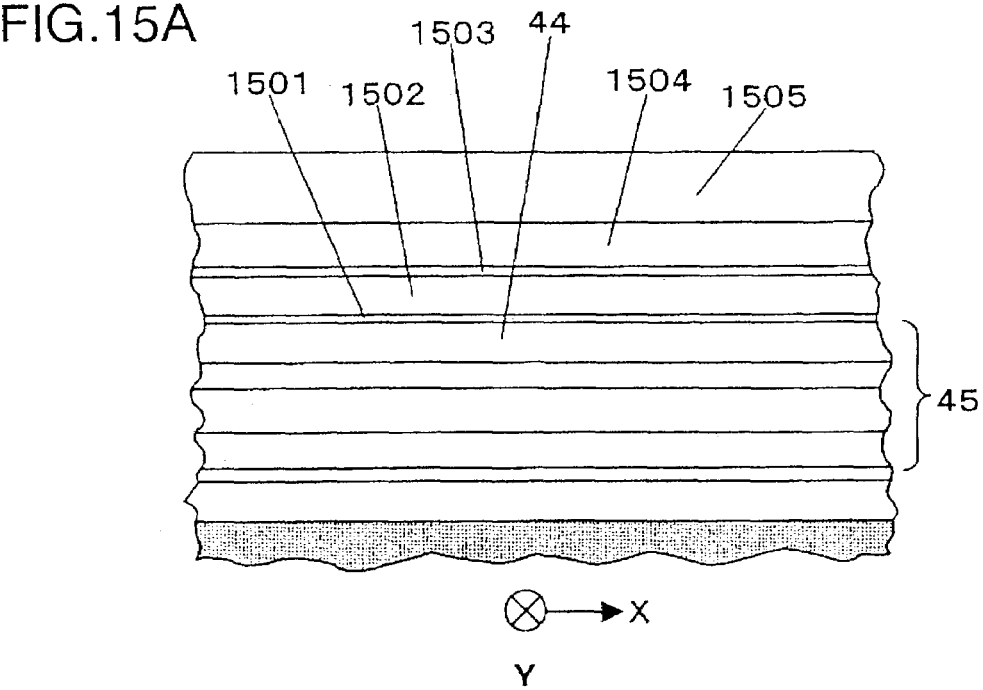
FIGS. 15A and 15B are front outline views used to describe a second stage of process steps for manufacturing a thin film head in accordance with another example of a fourth exemplary embodiment of the present invention.
Figure 15B:
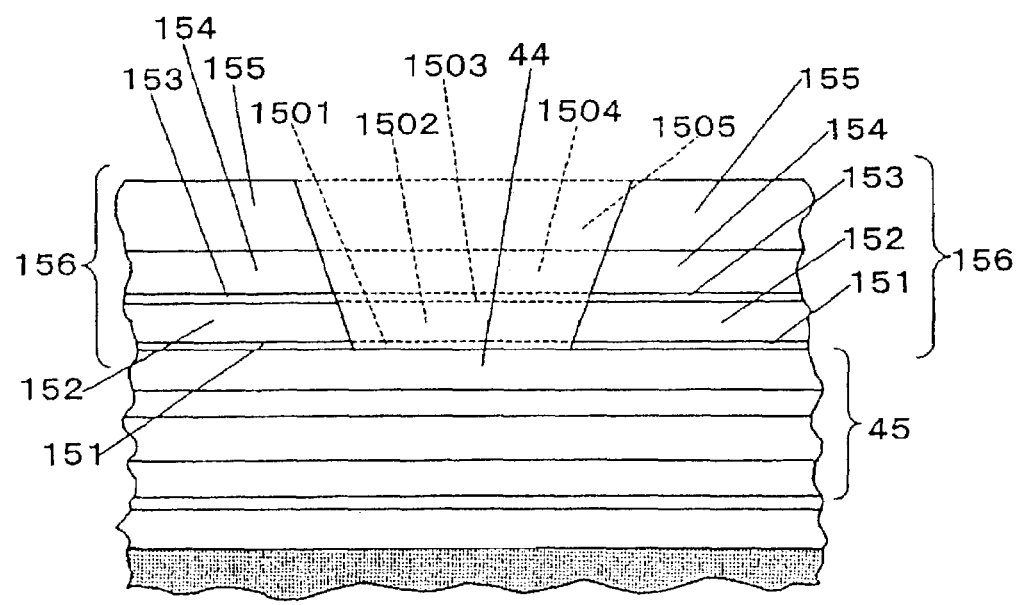

Next, other method for manufacturing the laminated transverse biasing layer of the present embodiment is described below. As shown in FIG. 15A, a first nonmagnetic layer 1501, a first ferromagnetic layer 1502, a second nonmagnetic layer 1503, a second ferromagnetic layer 1504 and an antiferromagnetic layer 1505 are deposited sequentially covering the upper surface of a free magnetic layer 44 of GMR element 45. Then, as shown in FIG. 15B, at least the first ferromagnetic layer 1502, the second nonmagnetic layer 1503, the second ferromagnetic layer 1504 and the antiferromagnetic layer 1505 are removed in part by dry etching or other method so that upper surface of the first nonmagnetic layer 1501 or the free magnetic layer 44 constituting GMR element 45 is exposed, for providing a pair of the right and the left laminated transverse biasing layers 156 each consisting of a first nonmagnetic layer 151, a first ferromagnetic layer 152, a second nonmagnetic layer 153, a second ferromagnetic layer 154 and an antiferromagnetic layer 155. Also in this case, it is preferred that the heat treatment for orientating the magnetizing direction in the pinned layer of GMR element or the ferromagnetic layer of laminated transverse biasing layer to a certain specific direction is conducted before exerting the dry etching process, and after the antiferromagnetic layer 1505 has been formed.

Figure 16:
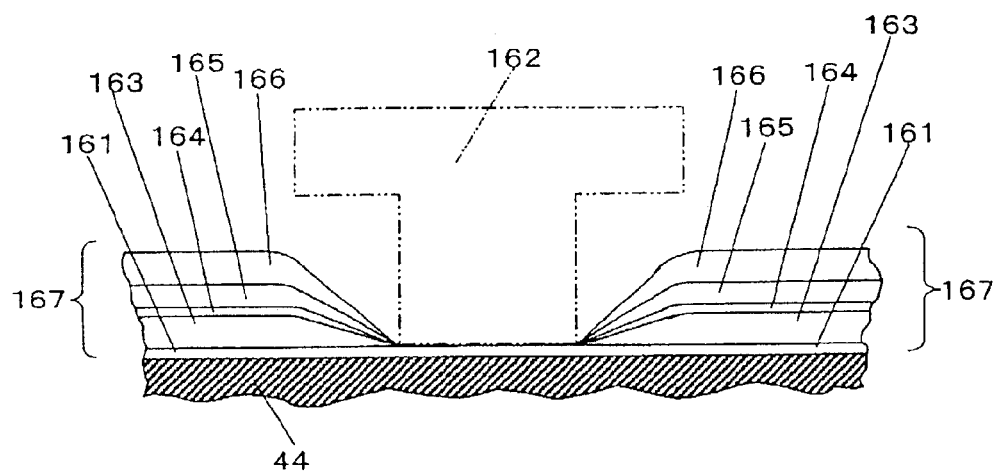
FIG. 16 is a front outline view used to describe a second stage of a process step for manufacturing a thin film head in accordance with another example of a fourth exemplary embodiment of the present invention.
Figure 17:
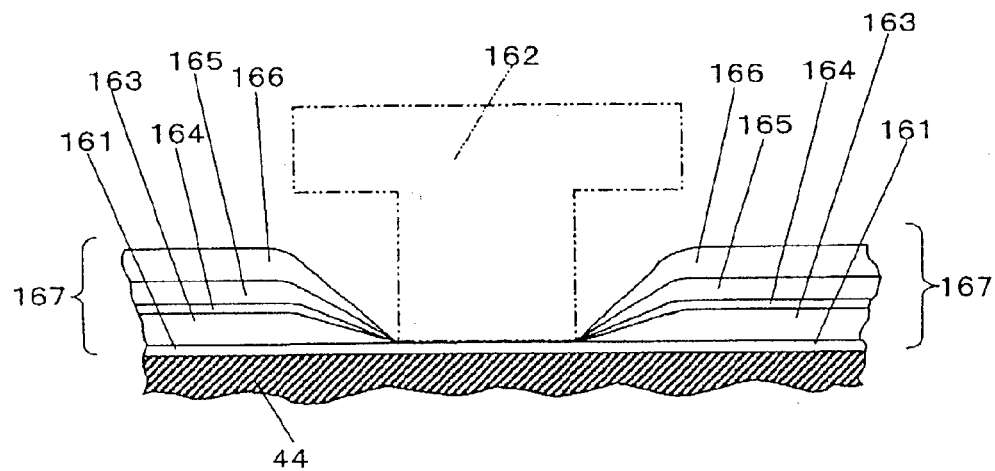
FIG. 17 is a front outline view used to describe a third stage of a process step for manufacturing a thin film head in accordance with another example of a fourth exemplary embodiment of the present invention.

Still other method for manufacturing the laminated transverse biasing layer of the present embodiment is described below. As shown in FIG. 16, after a first nonmagnetic layer 161 is formed covering the upper surface of the free magnetic layer 44 of GMR element, a mushroom-shape resist 162 is provided. Then, using the resist 162 as mask, a pair of the right and the left laminated transverse biasing layers 167 are formed, each consisting of a first ferromagnetic layer 163, a second nonmagnetic layer 164, a second ferromagnetic layer 165 and an antiferromagnetic layer 166.

The lead layer may be provided in a method as shown in FIG. 17A. The mushroom-shape resist 162 is removed from the state of FIG. 13B, and a lead layer 171 is formed covering the pair of the right and the left antiferromagnetic layers 133 and the exposed region of the free magnetic layer 44 of GMR element. Then the lead layer 171 is removed in part by dry etching or other method so that part of the upper surface of the free magnetic layer 44 is exposed. Thus a pair of the right and the left lead layers 172 are provided.

Other method for providing a pair of lead layers 174 is shown in FIG. 17B. After the pair of laminated transverse biasing layers 167 are formed through the procedure as shown in FIG. 16, a lead layer 173 is formed covering the exposed region of the first nonmagnetic layer 161 and the antiferromagnetic layers 166. Then the lead layer 173 is removed in part by dry etching or other method so that the upper surface of the nonmagnetic layer 161 or the free magnetic layer 44 is exposed. Thus a pair of the right and the left lead layers 174 are provided.

Figure 18A:
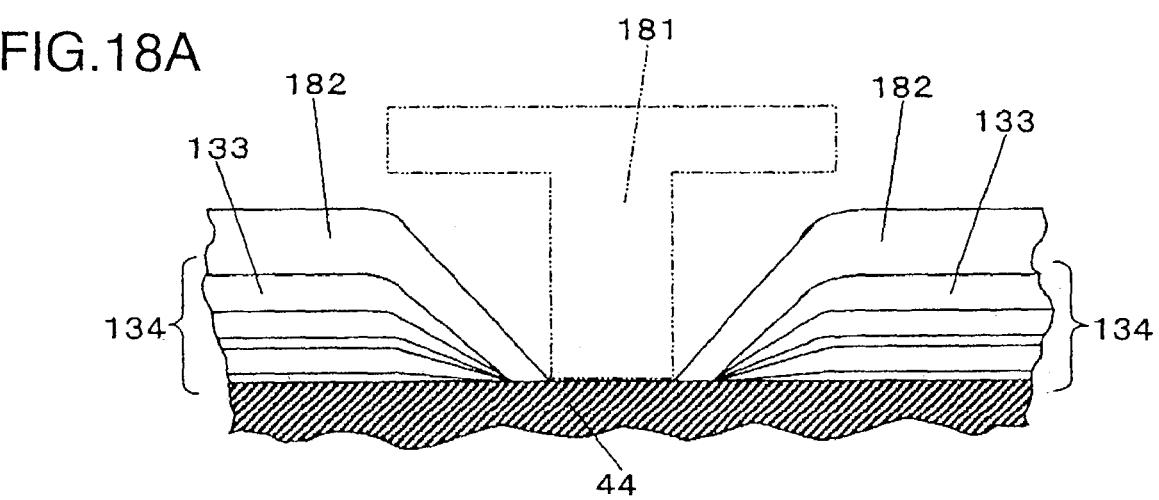
FIGS. 18A and 18B are front outline views used to describe a third stage of process steps for manufacturing a thin film head in accordance with another example of a fourth exemplary embodiment of the present invention.

Still other method for providing a lead layer in the present embodiment 4 is shown in FIG. 18A; where, the mushroom-shape resist 121 is removed after the layers have been formed up to the antiferromagnetic layer 133 as shown in FIG. 13B, other mushroom-shape resist 181 is provided as shown in FIG. 18A for providing a conductive layer covering the antiferromagnetic layers 133 and the exposed region of the free magnetic layer 44. Thus a pair of the right and the left lead layers 182 are provided.

Figure 18B:
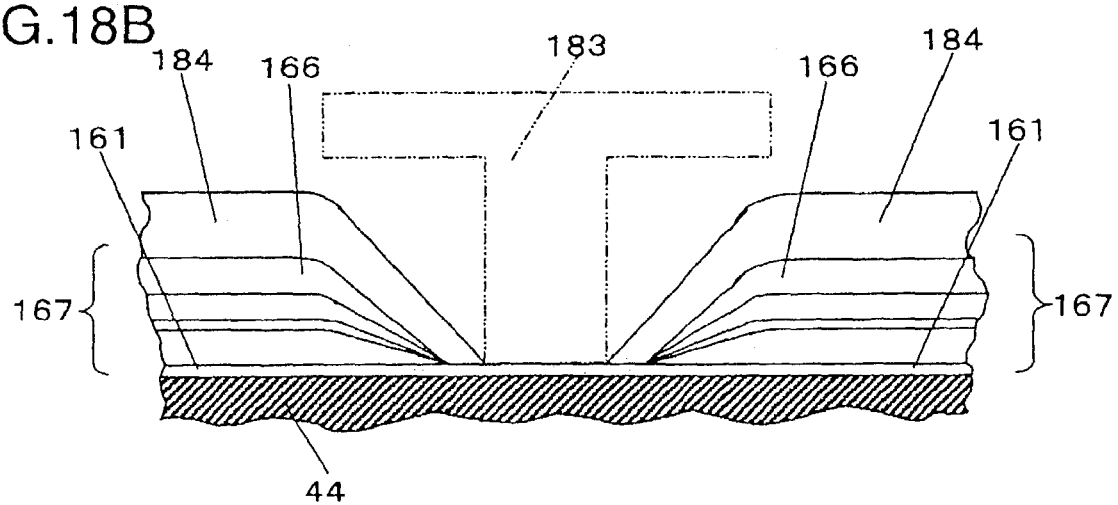

A pair of the right and the left lead layers 184 can also be provided through a still other method. The mushroom-shape resist 162 is removed after the layers have been formed up to the antiferromagnetic layer 166 as shown in FIG. 16, other mushroom-shape resist 183 is provided as shown in FIG. 18B for forming a conductive layer covering the antiferromagnetic layers 166 and the exposed region of the nonmagnetic layer 161 locating on free magnetic layer 44. Thus a pair of the right and the left lead layers 184 are provided.

As other example, a cap layer may be provided before forming the new mushroom-shape resist 181, or 182; and then the pair of lead layers 182, or 184, can be formed through the same procedure.

Figure 19:
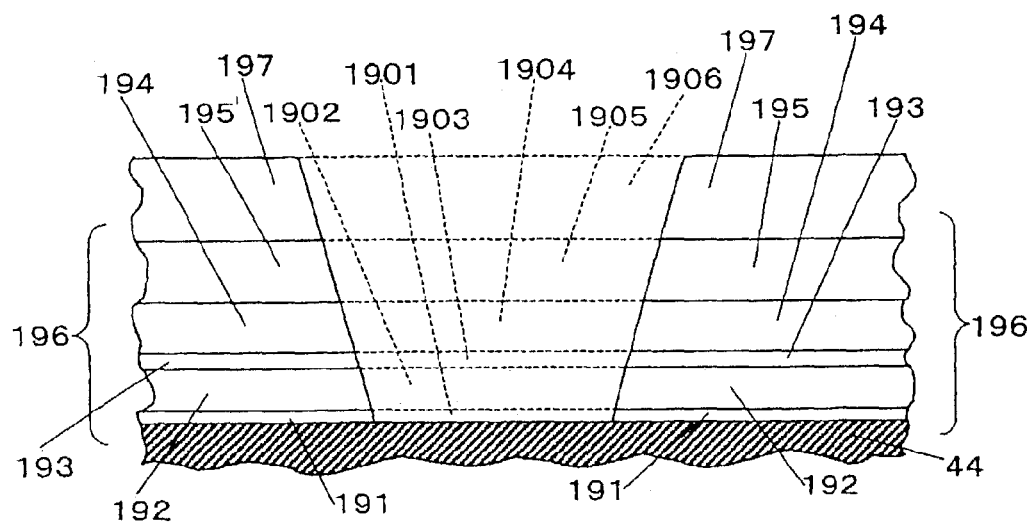
FIG. 19 is a front outline view used to describe a second stage of a process step for manufacturing a thin film head in accordance with another example of a fourth exemplary embodiment of the present invention.

Other method for providing the laminated biasing layer and the lead layer is described using FIG. 19. On the upper surface of the free magnetic layer 44 of GMR element, laminated transverse biasing layer comprised by a first nonmagnetic layer 1901, a first ferromagnetic layer 1902, a second nonmagnetic layer 1903, a second ferromagnetic layer 1904 and an antiferromagnetic layer 1905 are deposited sequentially. Further on top of it, a lead layer 1906 is formed. Then, as shown in FIG. 19, the lead layer 1906 and the layers constituting the laminated transverse biasing layer are removed in part by dry etching or other method so that part of the free magnetic layer 44 is exposed. Thus a pair of the right and the left laminated transverse biasing layers 196 and lead layers 197 are provided. The dry etching may be discontinued at the surface of the first nonmagnetic layer 1901. Also in the present method of manufacture, it is preferred that the heat treatment for orientating the respective magnetizing direction in the pinned layer or the ferromagnetic layer of laminated transverse biasing layer to a certain specific direction is conducted before exerting the dry etching, and after the layers from the first nonmagnetic layer 1901 through the lead layer 1906 have been formed.

The above-configured present embodiment 4 generates similar effects as those of embodiment 3. By deciding the layer thickness of the second nonmagnetic layer of laminated transverse biasing layer at a certain specific value the direction of magnetization in the first ferromagnetic layer and the second ferromagnetic layer can be established to be opposite to each other. As a result, leakage magnetic fields emerging at the end portions of the first and the second ferromagnetic layers offset to each other, which contributes to eliminating a turbulence in the magnetizing direction that may arise in the first and the second ferromagnetic layers. Therefore, the magnetization in the first and the second ferromagnetic layers is orientated in an excellent order to the respective end portions, and the magnetizing direction in the adjacent free magnetic layers becomes more stabilized. Thus a magnetoresistive thin film head having more stabilized reproducing performance is offered in accordance with the fourth embodiment of the present invention.

A fifth exemplary embodiment of the present invention is described using FIGS. 20A–20C, 21, 22A and 22B. These drawings show cross sectional views of a magetoresistive thin film head of the present invention sectioned at a plane parallel to the sliding surface facing a recording medium, in the vicinity of the reproducing part. In the following, a method for manufacturing the reproducing part of a magnetoresistive thin film head is described referring to the drawings.

Figure 20A:
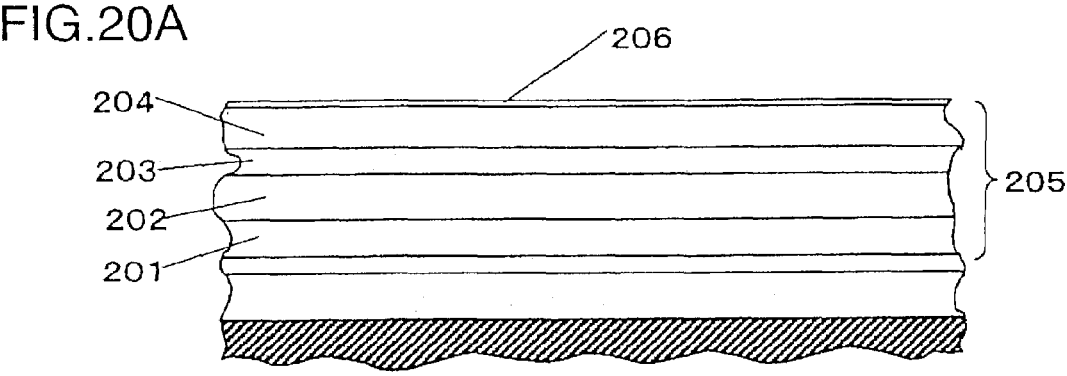
FIGS. 20A–20C are front outline views used to describe first, second and third stages of process steps for manufacturing a thin film head in accordance with a fifth exemplary embodiment of the present invention.

In the first process step, an antiferromagnetic layer 201, a pinned layer 202, a nonmagnetic conductive layer 203 and a free magnetic layer 204 are stacked to form a GMR element 205. A cap layer 206 is formed thereon using Ta or other nonmagnetic material for preventing the free magnetic layer 204 from corrosion, as shown in FIG. 20A.

Figure 20B:
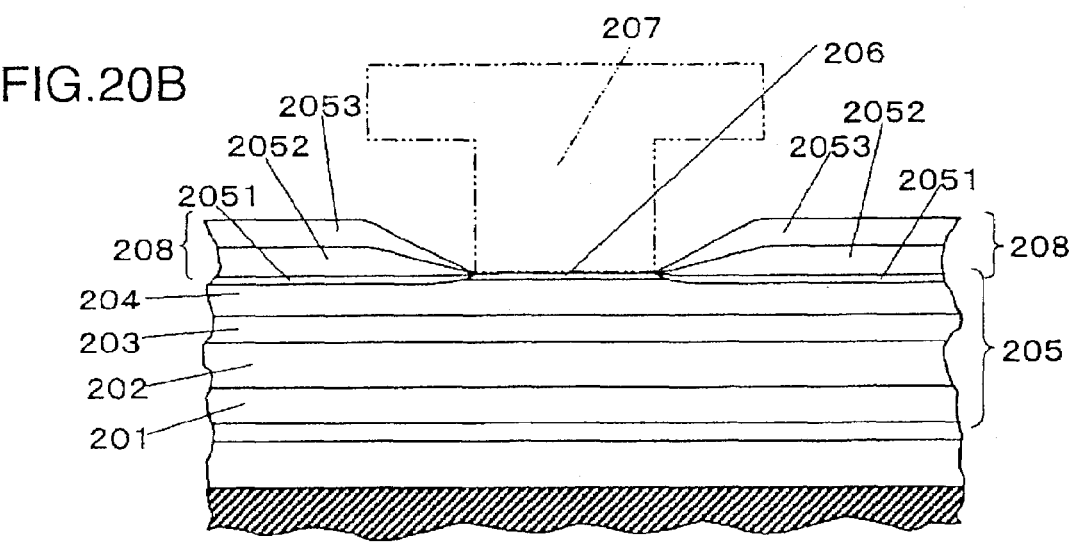

In the second process step, as shown in FIG. 20B, a mushroom-shape resist 207 is provided, and using the resist 207 as mask the cap layer 206 is removed in part by ion milling or other method so that the free magnetic layer 204 is exposed. And then, a nonmagnetic layer 2051, a ferromagnetic layer 2052 and an antiferromagnetic layer 2053 are stacked in the order for providing a pair of the right and the left laminated transverse biasing layers 208.

Figure 20C:
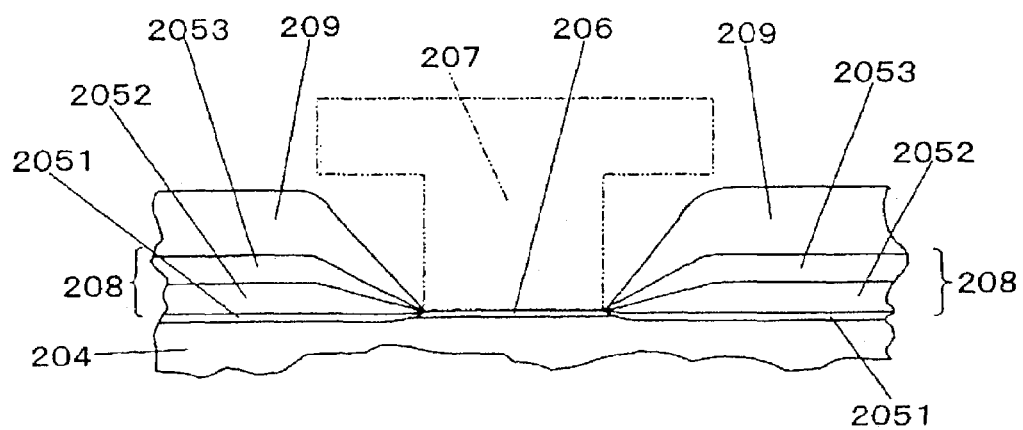

In the third process step, as shown in FIG. 20C, a pair of the right and the left lead layers 209 are formed on the antiferromagnetic layer 2053, using Cu, Cr, Ta or other nonmagnetic conductive material. The reproducing part of a magnetoresistive thin film head is thus manufactured.

Figure 21:
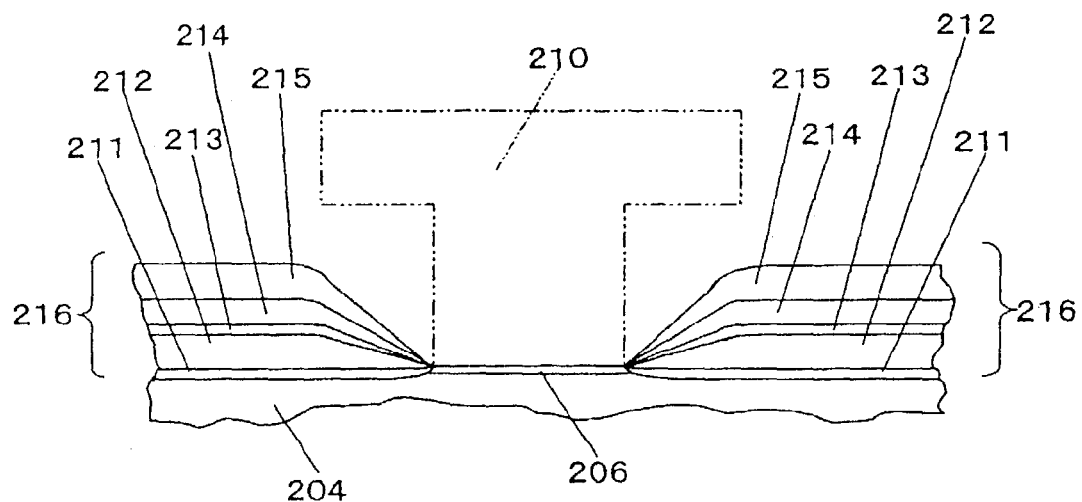
FIG. 21 is a front outline view used to describe a second stage of a process step for manufacturing a thin film head in accordance with another example of a fifth exemplary embodiment of the present invention.

In the above-described second process step after the first nonmagnetic layer 211 is formed, the ferromagnetic layer of laminated transverse biasing layer may be formed instead with a first ferromagnetic layer 212 and a second ferromagnetic layer 214 interposing a nonmagnetic layer 213 in between. And an antiferromagnetic layer 215 on top of the second ferromagnetic layer is formed for providing a pair of the right and the left laminated transverse biasing layers 216, as shown in FIG. 21.

The pinned layer formed in the above-described first process step may be provided instead in the form of a laminated pinned layer consisting of two pinned layers facing to each other with a nonmagnetic layer interposing in between, as shown in FIG. 2C of embodiment 2. In the same manner, the free magnetic layer may be provided instead in the form of a laminated free magnetic layer consisting of a plurality of layers, where adjacent layers are made of different kind of soft magnetic material, as shown in FIG. 2D of embodiment 2.

Figure 22A:
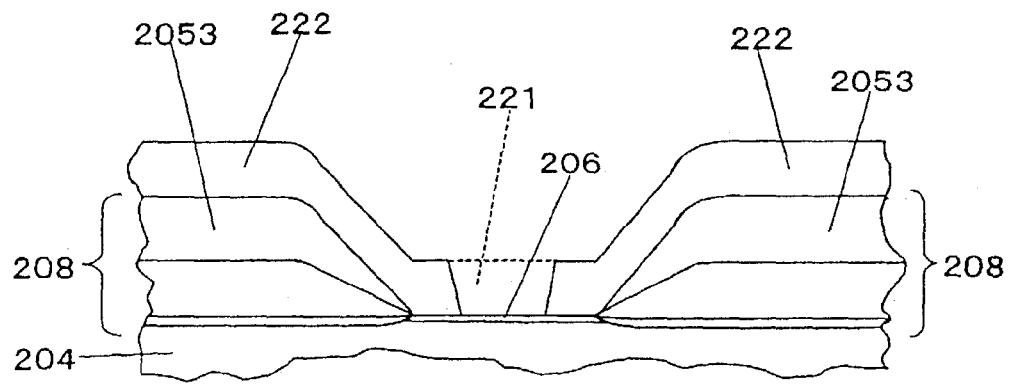
FIGS. 22A and 22B are front outline views used to describe a third process step for manufacturing a thin film head in accordance with another example of a fifth exemplary embodiment of the present invention.
Figure 22B:
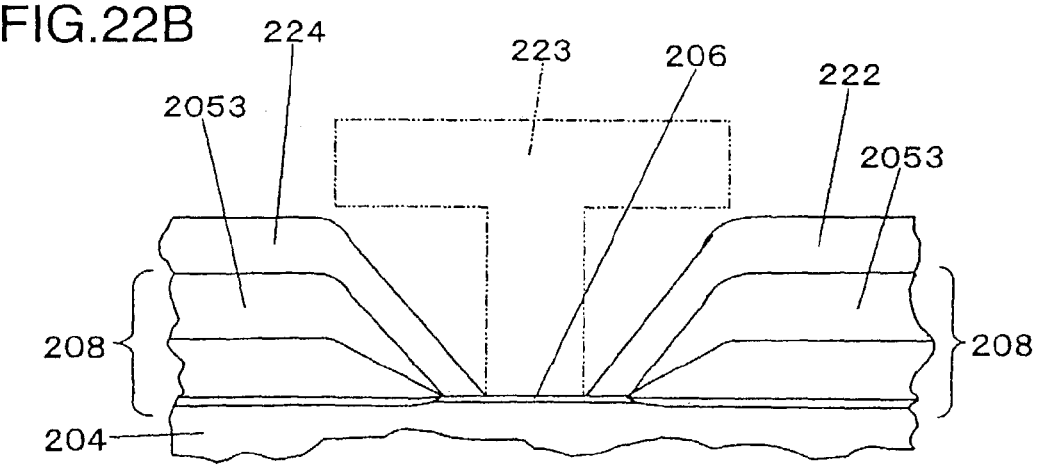
Figure 23:
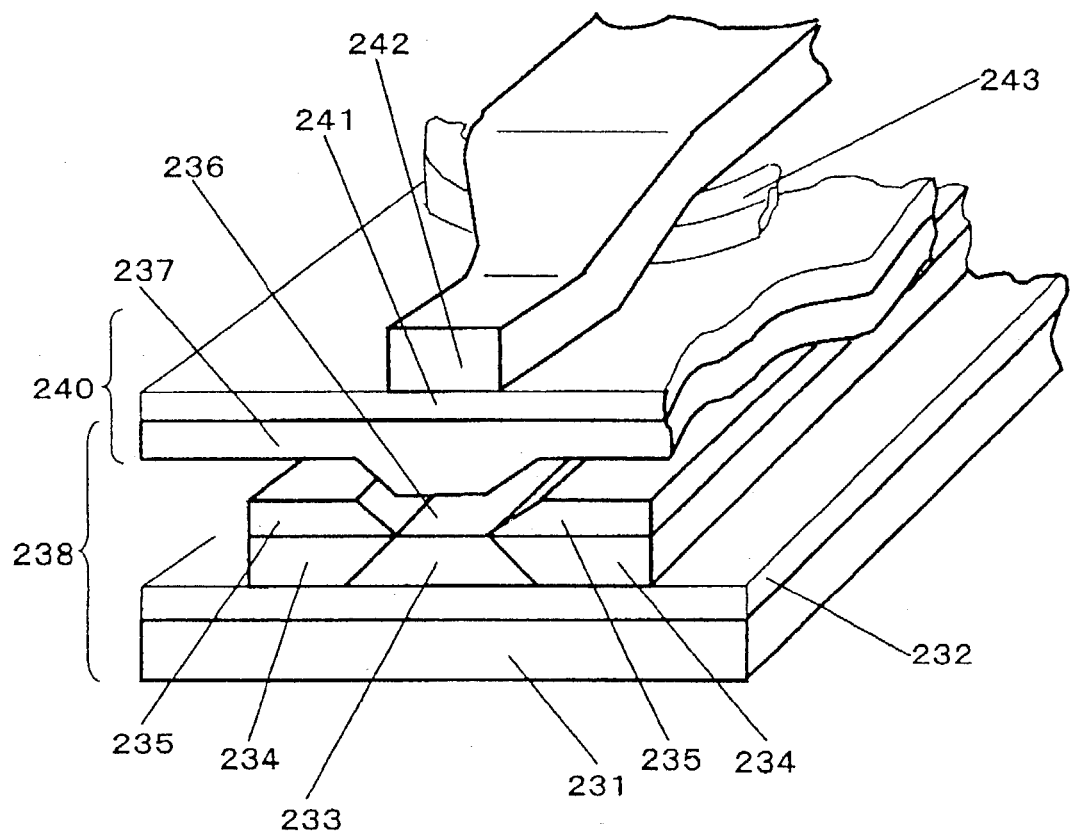
FIG. 23 is a perspective view showing an outline of a conventional thin film head.
Figure 24:
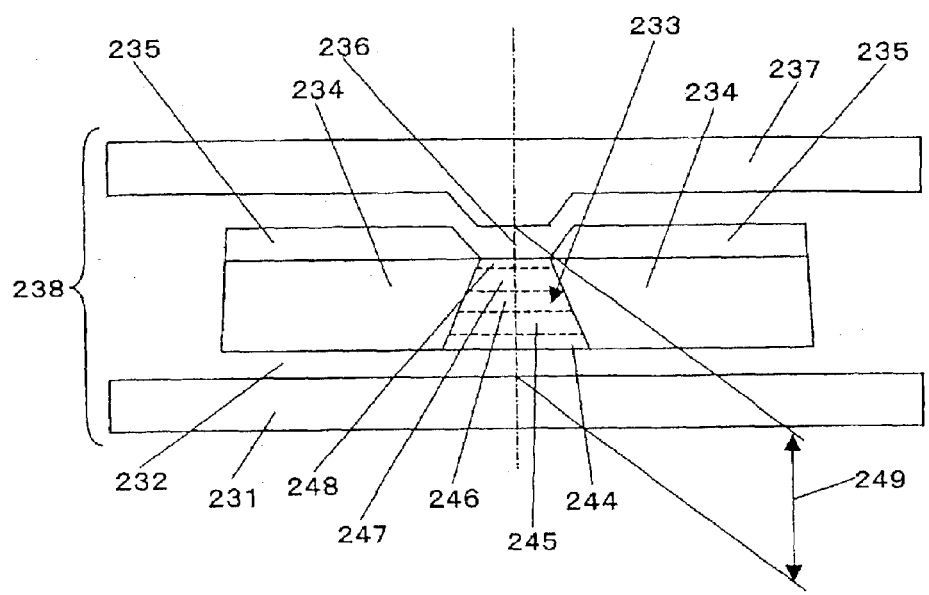
FIG. 24 is a front outline view showing the structure of a conventional thin film head.

In the third process step, as shown in FIG. 22A, a lead layer 221 may be formed instead on the pair of the right and the left antiferromagnetic layers 2053 and the cap layer 206 removing the mushroom-shape resist 210. Then the lead layer 221 is removed in part by dry etching or other method so that part of the cap layer 206 is exposed; for providing a pair of the right and the left lead layers 222.

Also in the third process step, after removing the mushroom-shape resist 210 provided in the second process, a new mushroom-shape resist 223 may be formed instead, and a pair of the right and the left lead layers 224 may be formed using Cu or other nonmagnetic conductive material covering the pair of antiferromagnetic layers 2053 and the exposed region of cap layer 206, using the new resist 223 as mask. The same procedure applies for providing a pair of lead layers in a configuration where a laminated transverse biasing layer is consisting of five layers, viz. a first nonmagnetic layer, a first ferromagnetic layer, a second nonmagnetic layer, a second ferromagnetic layer and an antiferromagnetic layer.

The above-configured present embodiment 5 exhibits similar effects as those of embodiment 3 and embodiment 4, and provides a more stable orientation of the magnetizing direction in the free magnetic layer. In this way, a magnetoresistive thin film head having a more stabilized reproducing capability is offered.

As has been described in the foregoing, in the present invention, a laminated transverse biasing layer is provided on a free magnetic layer of GMR element, which laminated transverse biasing layer being formed of a nonmagnetic layer, a ferromagnetic layer and an antiferromagnetic layer. Under the above-described structure, the magnetizing direction in ferromagnetic layer of the laminated transverse biasing layer is orientated to a certain specific direction by the effect of exchange-coupling magnetic fields with the adjacent antiferromagnetic layer. Furthermore, strong exchange-coupling magnetic fields is generated between the ferromagnetic layer of laminated transverse biasing layer and the free magnetic layer of GMR element, which layers are placed facing each other with a nonmagnetic layer interposed in between. This is because nonmagnetic layer has a certain specific thickness so that the exchange-coupled magnetic field is significantly enhanced as compared to a conventional configuration where the free magnetic layer is disposed in direct contact with the antiferromagnetic layer. Thus in the structure of the present invention, orientation of the magnetizing direction in the free magnetic layer in the regions facing to the ferromagnetic layer with a nonmagnetic layer interposing in between is quite stabilized. And the orientation of the magnetizing direction in the free magnetic layer in a region between the right and the left free magnetic layers, too, is readily orientated to the same direction in a stable manner. As the result, a magnetoresistive head of the present invention exhibits an excellent reproducing performance with high reproducing sensitivity and least noise generation. It provides a substantial advantage when implemented in the thin film head, among others, whose gap length is narrow for reproducing recorded signals stored at a high recording density. Thus the thin film head of such a superior reproducing capability can be manufactured easily in accordance with the present invention.

What is claimed is:

1. A method for manufacturing thin film head comprising:
   a first step of stacking an antiferromagnetic layer, a pinned layer, a nonmagnetic conductive layer and a free magnetic layer in order of an upper surface of a lower gap layer formed on a lower magnetic shield layer for providing a magnetoresistive element;
   a second step of stacking a nonmagnetic layer, a ferromagnetic layer and an antiferromagnetic layer on said free magnetic layer locating at the uppermost stratum of said magnetoresistive element for forming a pair of left and right laminated transverse biasing layers, each consisting of said nonmagnetic layer, said ferromagnetic layer and said antiferromagnetic layer; and
   a third step for forming a pair of left and right lead layers on said antiferromagnetic layers locating at the uppermost strata of said laminated transverse biasing layers.

2. The thin film head manufacturing method of claim 1, wherein the second step is first cleaning said free magnetic layer formed at the uppermost stratum of said magnetoresistive element, and then stacking the nonmagnetic layer, the ferromagnetic layer and the antiferromagnetic layer on said free magnetic layer for forming the pair of the right and the left laminated transverse biasing layers.

3. The thin film head manufacturing method of claim 1, wherein the second step is stacking the nonmagnetic layer, the ferromagnetic layer and the antiferromagnetic layer in order covering said free magnetic layer formed at the uppermost stratum of said magnetoresistive element, and then removing in part at least said ferromagnetic layer and said antiferromagnetic layer so that part of said nonmagnetic layer or part of said free magnetic layer formed at the uppermost stratum of said magnetoresistive element is exposed for forming the pair of the right and the left laminated transverse biasing layers, each including nonmagnetic layer, ferromagnetic layer and antiferromagnetic layer.

4. The thin film head manufacturing method of claim 3, wherein after the nonmagnetic layer, the ferromagnetic layer and the antiferromagnetic layer are formed in the order covering the upper surface of the free magnetic layer formed at the uppermost stratum of said magnetoresistive element, a heat treatment is exerted for orientating the respective directions of said ferromagnetic layer and said pinned layer to a certain specific direction, before removing part of said laminated nonmagnetic layer, ferromagnetic layer and antiferromagnetic layer so that part of said nonmagnetic layer, or part of said free magnetic layer, is exposed for providing a pair of the right and the left laminated transverse biasing layers.

5. The thin film head manufacturing method of claim 1, wherein the second step is forming the nonmagnetic layer covering said free magnetic layer formed at the uppermost stratum of said magnetoresistive element, and then stacking on top of the nonmagnetic layer a pair of the right and the left ferromagnetic layers and antiferromagnetic layers in order for forming the pair of the right and the left laminated transverse biasing layers, each including nonmagnetic layer, ferromagnetic layer and antiferromagnetic layer.

6. The thin film head manufacturing method of claim 5, wherein the third step is forming a lead layer covering said pair of the right and the left antiferromagnetic layers formed at the uppermost strata of said laminated transverse biasing layers and an exposed upper surface of said nonmagnetic layer formed at the lowest stratum, and then removing part of said lead layer so that part of said magnetoresistive element, is exposed for providing the pair of the right and the left lead layers.

7. The thin film head manufacturing method of claim 5, wherein the third step is forming the pair of the right and the left lead layers on said pair of the right and the left antiferromagnetic layers formed at the uppermost strata of said laminated transverse biasing layers and exposed upper surface of said nonmagnetic layer formed at the lowest stratum, by using a resist mask.

8. The thin film head manufacturing method recited in claim 1, wherein the third step is forming a lead layer covering said pair of the right and the left antiferromagnetic layers formed at the uppermost strata of said laminated transverse biasing layers and an exposed upper surface of said nonmagnetic layer, or said magnetoresistive element, and then removing part of said lead layer so that part of said nonmagnetic layer, or part of said magnetoresistive element, is exposed for providing the pair of the right and the left lead layers.

9. The thin film head manufacturing method recited in claim 1, wherein the third step is forming the pair of the right and the left lead layers on said pair of the right and the left antiferromagnetic layers formed at the uppermost strata of said laminated transverse biasing layers and said nonmagnetic layers, or exposed upper surface of said magnetoresistive element, by using a resist mask.

10. The thin film head manufacturing method of claim 1, wherein the second step is forming the nonmagnetic layer, the ferromagnetic layer and the antiferromagnetic layer in the order covering said free magnetic layer formed at the uppermost stratum of said magnetoresistive element, and the third step is forming a lead layer covering said antiferromagnetic layer, and then removing in part at least said ferromagnetic layer, said antiferromagnetic layer and said lead layer so that part of said free magnetic layer formed at the uppermost stratum of said magnetoresistive element, is exposed for providing a pair of the right and the left laminated transverse biasing layers, each including said nonmagnetic layer, said ferromagnetic layer and said antiferromagnetic layer, and the pair of the right and the left lead layers.

11. The thin film head manufacturing method of claim 10, wherein after the nonmagnetic layer, the ferromagnetic layer, the antiferromagnetic layer and the lead layer are formed in the order covering the upper surface of said free magnetic layer formed at the uppermost stratum of said magnetoresistive element, a heat treatment is exerted for orientating the respective directions of magnetization of said ferromagnetic layer and said pinned layer to a certain specific direction, before removing in part at least laminated said ferromagnetic layer, said antiferromagnetic layer and said lead layer so that part of said free magnetic layer, is exposed for providing the pair of the right and the left laminated transverse biasing layers and lead layers.

12. The thin film head manufacturing method recited in claim 1, further comprising a fourth step for providing a cap layer on said pair of the right and the left lead layers and an exposed upper surface of said free magnetic layer, or said nonmagnetic layer, locating at the uppermost stratum of said magnetoresistive element, in order to enhance an antioxidation and anticorrosion capabilities.

13. The thin film head manufacturing method of claim 12, wherein after the cap layer is formed on said pair of the right and the left lead layers and said free magnetic layer formed at the uppermost stratum of said magnetoresistive element, or an exposed upper surface of said nonmagnetic layer, a heat treatment is exerted for orientating the respective directions of magnetization in said ferromagnetic layer and said pinned layer to a certain specific direction, before said cap layer, said pair of the right and the left lead layers, the pair of the right and the left laminated transverse biasing layers and said magnetoresistive element are shaped into a certain specific pattern for providing an upper gap layer.

14. The thin film head manufacturing method recited in claim 1, wherein the first step is forming the antiferromagnetic layer on the upper surface of the lower gap layer formed on lower magnetic shield layer, stacking on top of the antiferromagnetic layer a laminated pinned layer including a first pinned layer, a nonmagnetic layer and a second pinned layer, and stacking further on top of the laminated pinned layer, the nonmagnetic conductive layer and the free magnetic layer in the order for providing the magnetoresistive element.

15. The thin film head manufacturing method recited in claim 1, wherein the first step is forming the antiferromagnetic layer, the pinned layer and the nonmagnetic conductive layer in the order on the lower gap layer formed on the lower magnetic shield layer, stacking on top of the nonmagnetic conductive layer a laminated free magnetic layer including a first free magnetic layer, a second free magnetic layer and a free magnetic layer of n-th order using different kinds of soft magnetic materials, n being a positive integer greater than 1, for providing the magnetoresistive element.

* * * * *

UNITED STATES PATENT AND TRADEMARK OFFICE
CERTIFICATE OF CORRECTION

| | | |
|---|---|---|
| PATENT NO. | : 7,103,962 B2 | Page 1 of 1 |
| APPLICATION NO. | : 10/413735 | |
| DATED | : September 12, 2006 | |
| INVENTOR(S) | : Masaya Sakaguchi et al. | |

It is certified that error appears in the above-identified patent and that said Letters Patent is hereby corrected as shown below:

On the Title Page, FIELD (75), Inventors, "Sakaguci" should read --Sakaguchi--

Signed and Sealed this

Fifteenth Day of May, 2007

JON W. DUDAS
*Director of the United States Patent and Trademark Office*